US011785253B2

(12) United States Patent
Liu et al.

(10) Patent No.: US 11,785,253 B2
(45) Date of Patent: Oct. 10, 2023

(54) OVERLAPPED BLOCK MOTION COMPENSATION WITH DERIVED MOTION INFORMATION FROM NEIGHBORS

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/239,615

(22) Filed: Apr. 25, 2021

(65) Prior Publication Data
US 2021/0250587 A1    Aug. 12, 2021

Related U.S. Application Data

(63) Continuation of application No. PCT/IB2019/059339, filed on Oct. 31, 2019.

(30) Foreign Application Priority Data

Oct. 31, 2018    (WO) ................ PCT/CN2018/112948

(51) Int. Cl.
*H04N 19/00*    (2014.01)
*H04N 19/583*    (2014.01)
(Continued)

(52) U.S. Cl.
CPC ......... *H04N 19/583* (2014.11); *H04N 19/105* (2014.11); *H04N 19/139* (2014.11);
(Continued)

(58) Field of Classification Search
CPC ...................................................... H04N 19/00
See application file for complete search history.

(56) References Cited

U.S. PATENT DOCUMENTS 9,077,998 B2    7/2015    Wang et al.
9,554,133 B2    1/2017    Ye et al.
(Continued)

FOREIGN PATENT DOCUMENTS

CN    1984340 A    6/2007
CN    103999465 A    8/2014
(Continued)

OTHER PUBLICATIONS

Bross et al. "Versatile Video Coding (Draft 2),"Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.

(Continued)

*Primary Examiner* — Maryam A Nasri
(74) *Attorney, Agent, or Firm* — Perkins Coie LLP

(57) ABSTRACT

The present disclosure relates to overlapped block motion compensation with derived motion from neighbors. A method for video processing, comprising: determining, during a conversion between a current block of visual media data and a corresponding coded representation of the visual media data, at least one neighboring block for the current block; determining motion information of the at least one neighboring block; and performing Overlapped Block Motion Compensation (OBMC) for the current block based on the motion information of the at least one neighboring block, wherein the OBMC includes using an intermediate prediction values of one sub-block of the current block and a prediction values of at least one neighboring sub-block to generating a final prediction values of the sub-block.

20 Claims, 22 Drawing Sheets

(51) Int. Cl.
*H04N 19/105* (2014.01)
*H04N 19/159* (2014.01)
*H04N 19/176* (2014.01)
*H04N 19/513* (2014.01)
*H04N 19/139* (2014.01)
*H04N 19/196* (2014.01)

(52) U.S. Cl.
CPC ......... *H04N 19/159* (2014.11); *H04N 19/176* (2014.11); *H04N 19/196* (2014.11); *H04N 19/513* (2014.11); *H04N 19/521* (2014.11)

(56) References Cited

U.S. PATENT DOCUMENTS

| | | | |
|---|---|---|---|
| 10,057,570 | B2 | 8/2018 | Ye et al. |
| 10,230,980 | B2 | 3/2019 | Liu et al. |
| 10,587,883 | B2 | 3/2020 | Wang |
| 10,771,811 | B2 | 9/2020 | Liu et al. |
| 2004/0013309 | A1 | 1/2004 | Choi et al. |
| 2004/0264576 | A1 | 12/2004 | Woods et al. |
| 2007/0098067 | A1 | 5/2007 | Kim et al. |
| 2013/0128974 | A1 | 5/2013 | Chien et al. |
| 2016/0173875 | A1 | 6/2016 | Zhang et al. |
| 2016/0219302 | A1 | 7/2016 | Liu et al. |
| 2016/0366436 | A1 | 12/2016 | Lim et al. |
| 2017/0094305 | A1 | 3/2017 | Li et al. |
| 2018/0063531 | A1 | 3/2018 | Hu et al. |
| 2019/0230361 | A1 | 7/2019 | Zhang et al. |
| 2019/0246143 | A1 | 8/2019 | Zhang et al. |
| 2019/0297325 | A1* | 9/2019 | Lim ..................... H04N 19/119 |
| 2019/0327482 | A1 | 10/2019 | Lin et al. |
| 2020/0288139 | A1 | 9/2020 | Lee et al. |
| 2020/0288141 | A1 | 9/2020 | Chono |
| 2020/0288168 | A1 | 9/2020 | Zhang et al. |
| 2021/0243471 | A1 | 8/2021 | Liu et al. |

FOREIGN PATENT DOCUMENTS

| | | |
|---|---|---|
| CN | 107147911 A | 9/2017 |
| CN | 107211157 A | 9/2017 |
| CN | 108293131 A | 7/2018 |
| EP | 3217663 A1 | 9/2017 |
| JP | 2000050284 A | 2/2000 |
| WO | 2017157259 A1 | 9/2017 |
| WO | 2018070152 A1 | 4/2018 |
| WO | 2018081888 A1 | 5/2018 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001,2017.

Chen et al. "Video Coding Technology Proposal by National Chiao Tung University (NCTU)," Joint Collaborative Team On Video Coding of ISO/IEC JTC1/SC 29/WG 11 and ITU-TSG 16, JCT-VC Meeting, Apr. 15-23, 2010, Dresden, document JCTVC-A123, 2010.

Han et al. "CE4.1 3: Affine Motion Compensation Prediction," Joint Video Exploration Team (JVET) of ITU-T SG 16 WP 3 and ISO/IEC JTC 1/SC 29/WG 11, 11th Meeting, Ljubljana, SI, Jul. 10-18, 2018, document JVET-K0337, 2018.

Han et al. "CE4.4 6: Improvement on Merge/Skip Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0399, 2018.

JEM-7.0: https://jvet.hhi.fraunhofer.de/svn/svn_HMJEMSoftware/tags/ HM-16.6-JEM-7.0.

ITU-T and ISO/IEC, "High efficiency video coding", Rec. ITU-T H.265 | ISO/IEC 23008-2 (in force edition).

Jin et al. "Rext: On Intra Block Copy Motion Vector Coding," Joint Collaborative Team on Video Coding (JCT-VC) of TU-T SG 16 WP 3 and ISO/IEC JTC 1/SC 29/WG 11, 15th Meeting, Geneva, CH, Oct. 23-Nov. 1, 2013, document JCTVC-O0277, 2013.

Xiu et al. Description of SDR, HDR, and 360 degree Video Coding Technology Proposal by Interdigital Communications and Dolby Laboratories, Joint Video Experts Team (JVET) of ITU-T SG 16 WP 3 and iSO/IEC JTC 1/SC 29/WG 11, 10th Meeting, San Diego, US, Apr. 10-20, 2018, document JVET-J0015, 2018.

Xu et al. "CE8-2.2: Current Picture Referencing Using Reference Index Signaling," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0076, 2018.

Yang et al. "Description of CE4: Inter Prediction and Motion Vector Coding," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J1024, 2018.

International Search Report and Written Opinion from International Patent Application No. PCT/IB2019/059339 dated Jan. 29, 2020 (27 pages).

International Search Report and Written Opinion from International Patent Application No. PCT/IB2019/059341 dated Jan. 30, 2020 (20 pages).

International Search Report and Written Opinion from International Patent Application No. PCT/CN2020/071851 dated Mar. 26, 2020 (14 pages).

Non-Final Office Action from U.S. Appl. No. 17/238,639 dated Jun. 8, 2022.

Final Office Action from U.S. Appl. No. 17/238,639 dated Nov. 21, 2022.

\* cited by examiner

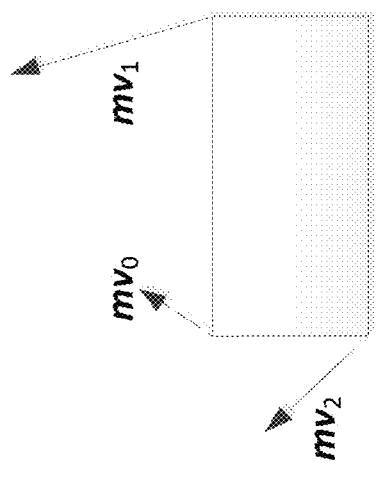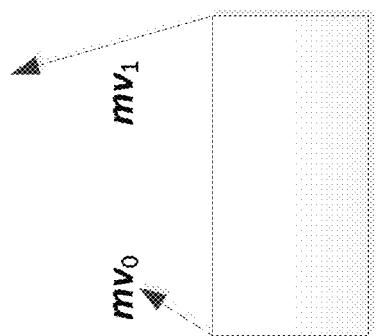
FIG. 7

OVERLAPPED BLOCK MOTION COMPENSATION WITH DERIVED MOTION INFORMATION FROM NEIGHBORS

CROSS REFERENCE TO RELATED APPLICATIONS

This application is a continuation of International Application No. PCT/IB2019/059339, filed on Oct. 31, 2019 which claims the priority to and benefits of International Application No. PCT/CN2018/112948, filed on Oct. 31, 2018. All of the aforementioned patent applications are hereby incorporated by reference in their entireties.

TECHNICAL FIELD

This patent document relates to video coding and decoding techniques, devices and systems.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video decoder or encoder embodiments for in which overlapped block motion compensation with derived motion from neighbors is used. The described methods may be applied to both the existing video coding standards (e.g., High Efficiency Video Coding (HEVC)) and future video coding standards or video codecs.

In one example aspect, a method of processing video comprises: determining, during a conversion between a current block of visual media data and a corresponding coded representation of the visual media data, at least one neighboring block for the current block; determining motion information of the at least one neighboring block; and performing Overlapped Block Motion Compensation (OBMC) for the current block based on the motion information of the at least one neighboring block, wherein the OBMC tool includes using an intermediate prediction values of one sub-block of the current block and a prediction values of at least one neighboring sub-block to generating a final prediction values of the sub-block.

In another example aspect, a method of processing video comprises: determining, during a conversion between a current block of visual media data and a corresponding coded representation of the visual media data, at least one neighboring block for the current block; determining motion information of the at least one neighboring block; and modifying motion information of the current block based on the motion information of the at least one neighboring block to generate modified motion information for the current block; performing processing of the current block based on the modified motion information.

In another example aspect, a method of processing video comprises: determining, during a conversion between a current block of visual media data and a corresponding coded representation of the visual media data, multiple neighboring blocks for the current block; determining motion information of the multiple neighboring blocks; determining a first prediction block for the current block based on the motion information of the current block; determining a second predication block for the current block based on the motion information of the multiple neighboring blocks; modifying the first prediction block based on the second prediction block; and performing processing of the current block based on the first prediction block.

In another example aspect, A video processing method, comprising: determining, during a conversion between a current block and a bitstream representation of the current block, a motion vector for a first sub-block inside the current block; using overlapped block motion compensation (OBMC) mode to perform the conversion; wherein the OBMC mode uses intermediate prediction values of the first sub-block based on the motion vector of the first sub-block and prediction values of at least a second video unit that is neighboring the first sub-block to generate final prediction values for the first sub-block; wherein a sub-block size of the first sub-block is based on block size, block shape, motion information, or reference picture of the current block.

In yet another representative aspect, the various techniques described herein may be embodied as computer readable recoding media on which a program comprising code is recorded, the program is for a processor to carry out a method for carrying out the methods described herein.

In yet another example aspect, a video encoder apparatus may implement the methods as described herein.

In yet another representative aspect, a video decoder apparatus may implement the methods as described herein.

The details of one or more implementations are set forth in the accompanying attachments, the drawings, and the description below. Other features will be apparent from the description and drawings, and from the claims.

BRIEF DESCRIPTION OF THE DRAWINGS

FIG. 7 shows an example of a 4-parameter affine model (a) and 6-parameter affine model (b).

DETAILED DESCRIPTION

The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This patent document is related to video coding technologies. Specifically, it is related to overlapped block motion compensation in video coding. It may be applied to the existing video coding standard like High Efficiency Video Coding (HEVC), or the standard (Versatile Video Coding) to be finalized. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the versatile video coding (VVC) standard targeting at 50% bitrate reduction compared to HEVC.

Figure 12:
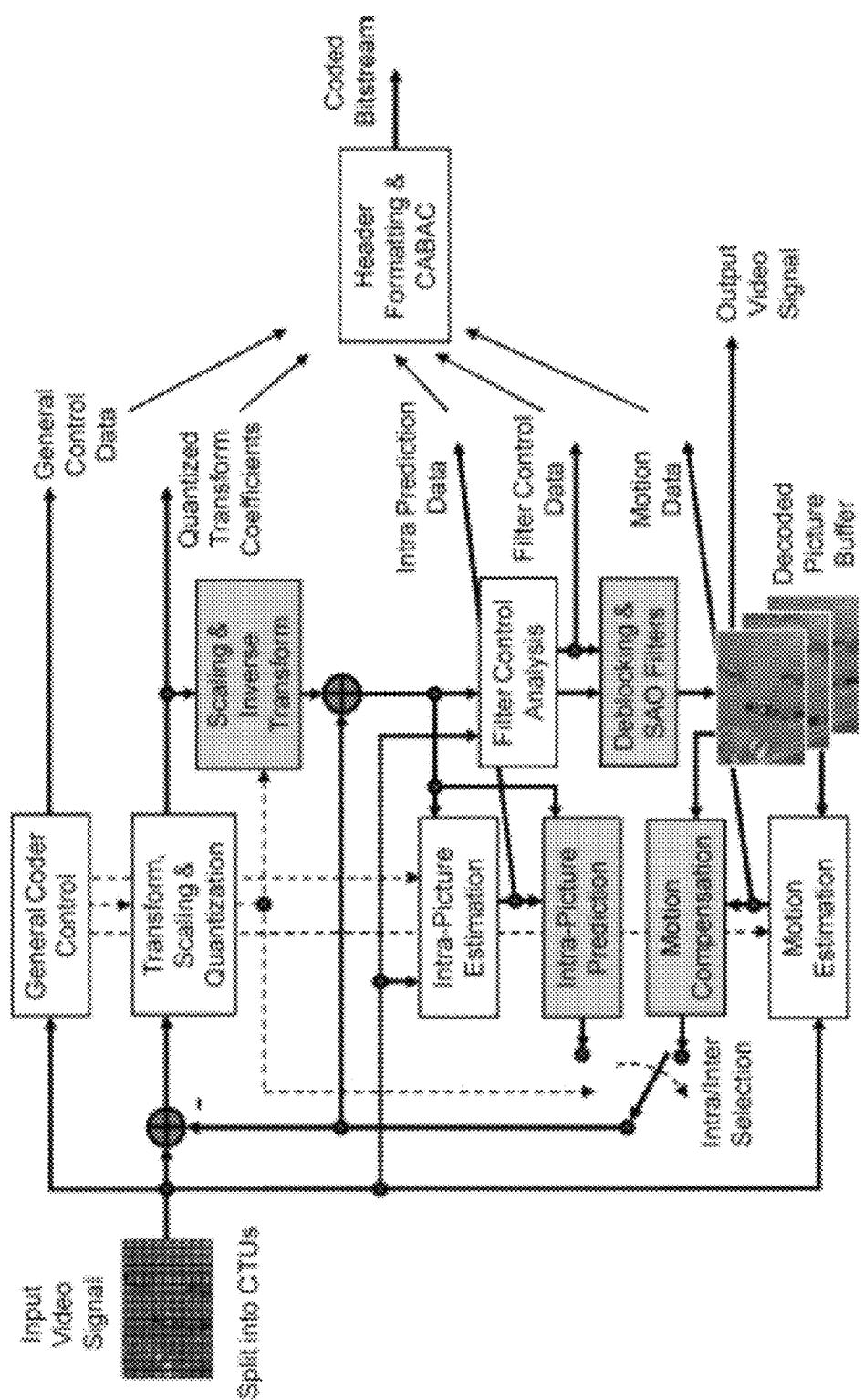
FIG. 12 shows a block diagram of an example implementation of a video encoder.

FIG. 12 is a block diagram of an example implementation of a video encoder. FIG. 12 shows that the encoder implementation has a feedback path built in in which the video encoder also performs video decoding functionality (reconstructing compressed representation of video data for use in encoding of next video data).

2.1 Sub-CU Based Motion Vector Prediction

In the JEM with quadtree binary tree (QTBT) partitioning, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

Figure 1:
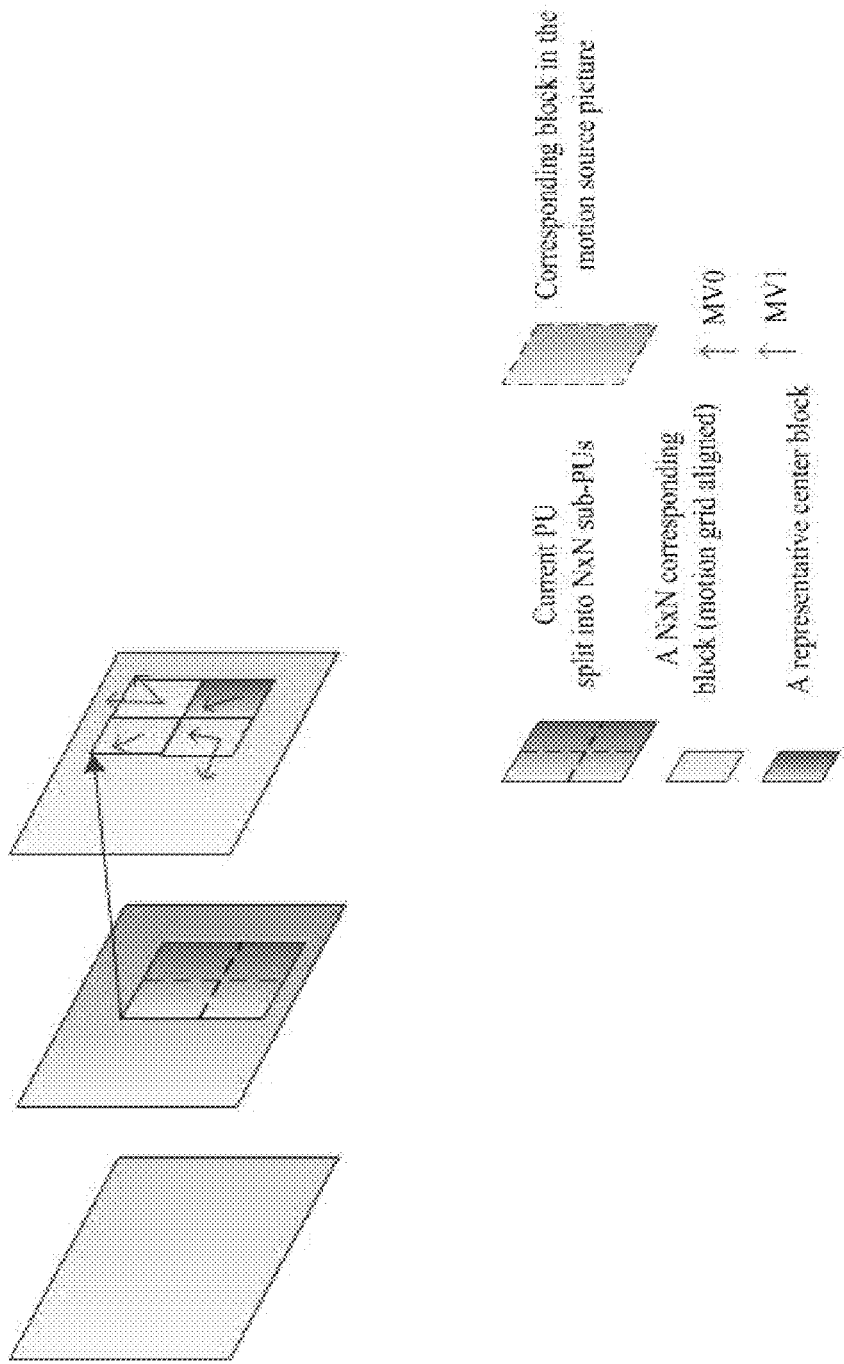
FIG. 1 shows an example of alternative temporal motion vector prediction (ATMVP) for a coding unit (CU).

FIG. 1 is an example of ATMVP motion prediction for a CU.

2.1.1. Alternative Temporal Motion Vector Prediction

In the alternative temporal motion vector prediction (ATMVP) method, the motion vectors temporal motion vector prediction (TMVP) is modified by fetching multiple sets of motion information (including motion vectors and reference indices) from blocks smaller than the current CU. Advanced Temporal Motion Vector Prediction (ATMVP) is also known as Subblock-based Temporal Motion Vector Prediction (SbTMVP). As shown in FIG. 1, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 1.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the picture order count POC of the current picture) is fulfilled and possibly uses motion vector MVx (the motion vector corresponding to reference picture list X) to predict motion vector MVy (with X being equal to 0 or 1 and Y being equal to 1-X) for each sub-CU.

2.1.2. Spatial-Temporal Motion Vector Prediction

Figure 2:
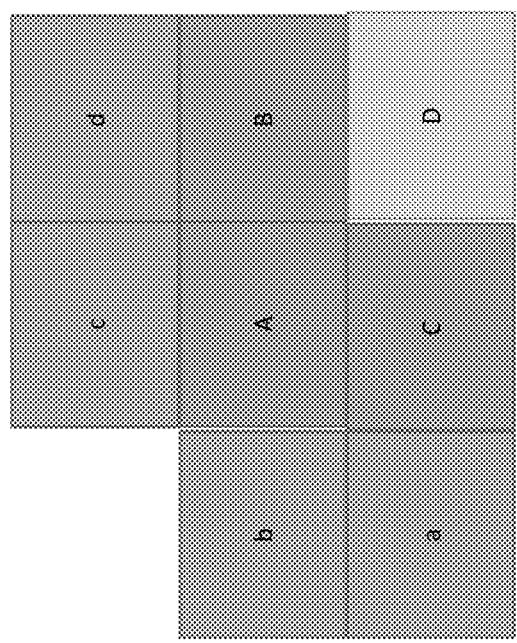
FIG. 2 shows an example of one CU with four sub-blocks A-D and its neighboring blocks a-d.

In this method, the motion vectors of the sub-CUs are derived recursively, following raster scan order. FIG. 2 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

FIG. 2 is an example of one CU with four sub-blocks (A-D) and its neighbouring blocks (a-d).

2.1.3. Sub-CU Motion Prediction Mode Signaling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index is context coded by context adaptive binary arithmetic coding CABAC. While in HEVC, only the first bin is context coded and the remaining bins are context by-pass coded.

2.2 Overlapped Block Motion Compensation

Overlapped Block Motion Compensation (OBMC) has previously been used in H.263. In the JEM, unlike in H.263, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, a MC block is corresponding to a coding block. When a CU is coded with sub-CU mode (includes sub-CU merge, affine and frame-rate upconversion, FRUC, mode), each sub-block of the CU is a MC block. To process CU boundaries in a uniform fashion, OBMC is performed at sub-block level for all MC block boundaries, where sub-block size is set equal to 4×4, as illustrated in FIG. 3.

When OBMC applies to the current sub-block, besides current motion vectors, motion vectors of four connected neighbouring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighbouring sub-block is denoted as PN, with N indicating an index for the neighbouring above, below, left and right sub-blocks and prediction block based on motion vectors of the current sub-block is denoted as PC. When PN is based on the motion information of a neighbouring sub-block that contains the same motion information to the current sub-block, the OBMC is not performed from PN. Otherwise, every sample of PN is added to the same sample in PC, i.e., four rows/columns of PN are added to PC. The weighting factors {1/4, 1/8, 1/16, 1/32} are used for PN and the weighting factors {3/4, 7/8, 15/16, 31/32} are used for PC. The exception are small MC blocks, (i.e., when height or width of the coding block is equal to 4 or a CU is coded with sub-CU mode), for which only two rows/columns of PN are added to PC. In this case weighting factors {1/4, 1/8} are used for PN and weighting factors {3/4, 7/8} are used for PC. For PN generated based on motion vectors of vertically (horizontally) neighbouring sub-block, samples in the same row (column) of PN are added to PC with a same weighting factor.

Figure 3:
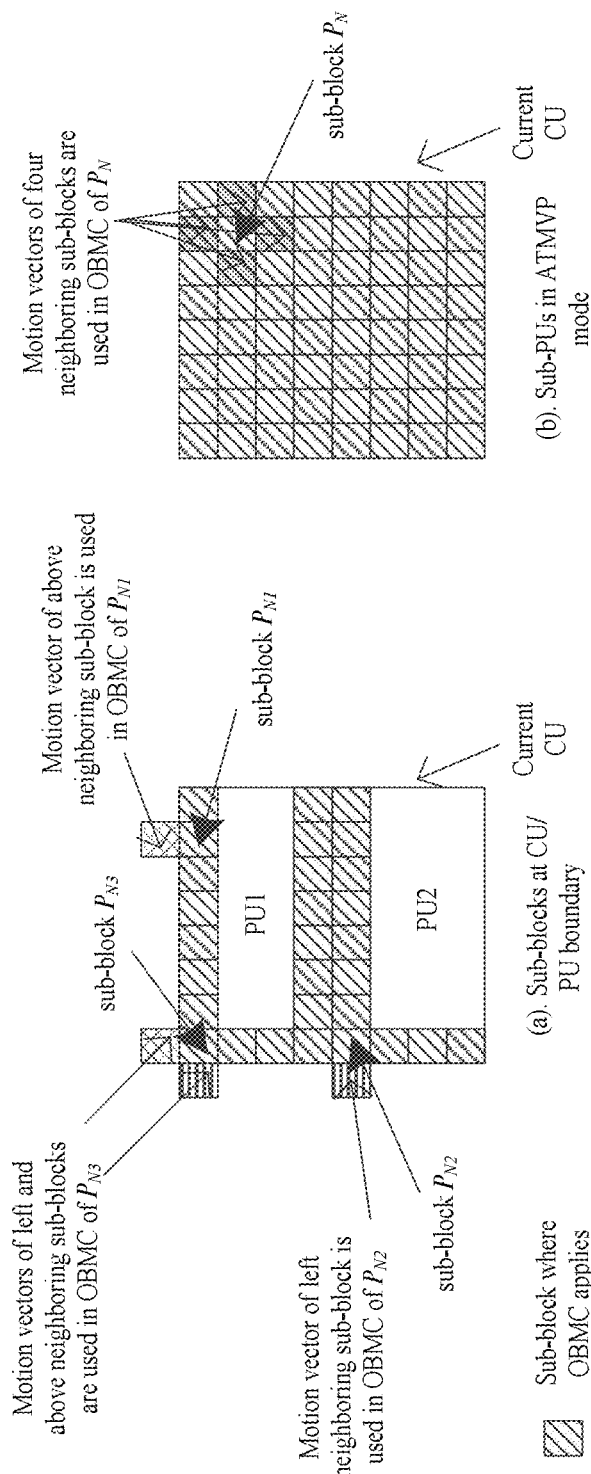
FIG. 3 shows an example of sub-blocks where overlapped block motion compensation (OBMC) applies.

FIG. 3 is an example of sub-blocks where OBMC applies.

In the JEM, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighbouring block and the left neighbouring block is used to compensate the top and left boundaries of the original signal of the current CU, and then the normal motion estimation process is applied.

2.3 Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

Figure 4:
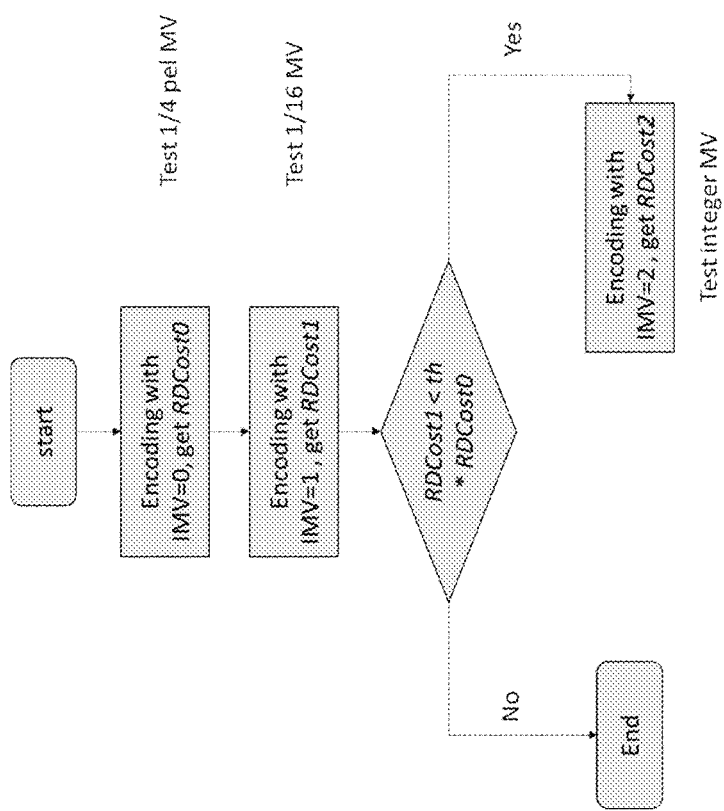
FIG. 4 shows an example of a flowchart of encoding with different motion vector (MV) precision.

The encoding process is shown in FIG. 4. First, 1/4 pel MV is tested and the RD cost is calculated and denoted as RDCost0, then integer MV is tested and the RD cost is denoted as RDCost1. If RDCost1<th*RDCost0 (wherein th is a positive value), then 4-pel MV is tested; otherwise, 4-pel MV is skipped. Basically, motion information and RD cost etc. are already known for 1/4 pel MV when checking integer or 4-pel MV, which can be reused to speed up the encoding process of integer or 4-pel MV.

FIG. 4 is an example of a flowchart of encoding with different MV precision.

2.4 Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to 1/16 pel. The higher motion vector accuracy (1/16 pel) is used in motion compensation inter prediction for the CU coded with skip/merge mode. For the CU coded with normal AMVP mode, either the integer-pel or quarter-pel motion is used, as described in section 2.3.

SHVC upsampling interpolation filters, which have same filter length and normalization factor as HEVC motion compensation interpolation filters, are used as motion compensation interpolation filters for the additional fractional pel positions. The chroma component motion vector accuracy is 1/32 sample in the JEM, the additional interpolation filters of 1/32 pel fractional positions are derived by using the average of the filters of the two neighbouring 1/16 pel fractional positions.

2.5. Affine Motion Compensation Prediction

Figure 5:
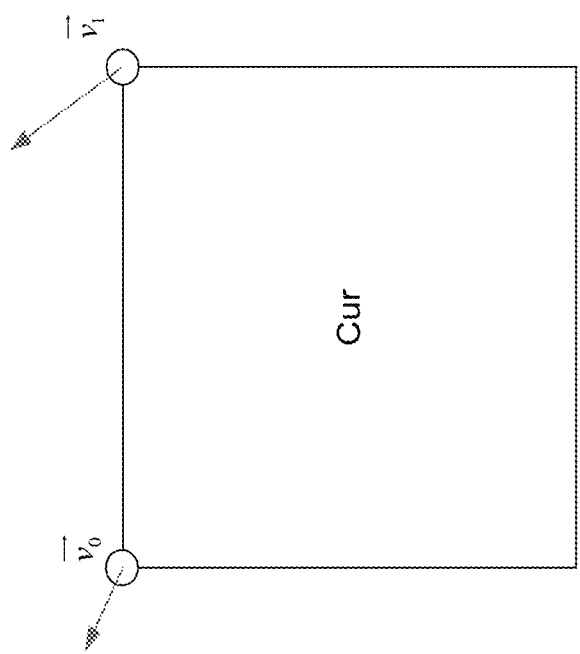
FIG. 5 shows an example of a simplified affine motion model.

In HEVC, only translation motion model is applied for motion compensation prediction (MCP). While in the real world, there are many kinds of motion, e.g. zoom in/out, rotation, perspective motions and he other irregular motions. In the JEM, a simplified affine transform motion compensation prediction is applied. As shown in FIG. 5, the affine motion field of the block is described by two control point motion vectors.

FIG. 5 is an example of a simplified affine motion model.

The motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (1)$$

Where (v0x, v0y) is motion vector of the top-left corner control point, and (v1x, v1y) is motion vector of the top-right corner control point.

In order to further simplify the motion compensation prediction, sub-block based affine transform prediction is applied. The sub-block size M×N is derived as in Equation 2, where MvPre is the motion vector fraction accuracy (1/16 in JEM), (v2x, v2y) is motion vector of the bottom-left control point, calculated according to Equation 1.

$$\begin{cases} M = \text{clip3}\left(4, w, \frac{w \times MvPre}{\max(\text{abs}(v_{1x} - v_{0x}), \text{abs}(v_{1y} - v_{0y}))}\right) \\ N = \text{clip3}\left(4, h, \frac{h \times MvPre}{\max(\text{abs}(v_{2x} - v_{0x}), \text{abs}(v_{2y} - v_{0y}))}\right) \end{cases} \quad (2)$$

After derived by Equation 2, M and N should be adjusted downward if necessary to make it a divisor of w and h, respectively.

Figure 6:
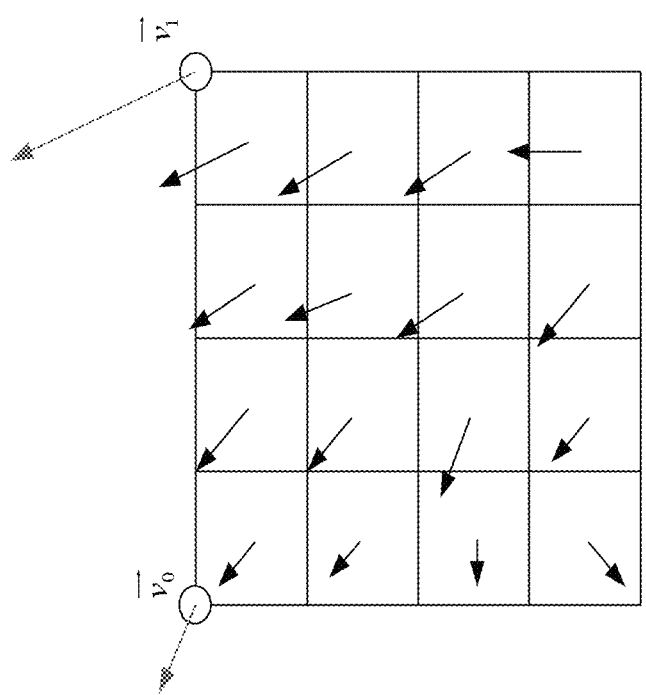
FIG. 6 shows an example of affine motion vector field (MVF) per sub-block.

To derive motion vector of each M×N sub-block, the motion vector of the center sample of each sub-block, as shown in FIG. 6, is calculated according to Equation 1, and rounded to 1/16 fraction accuracy. Then the motion compensation interpolation filters are applied to generate the prediction of each sub-block with derived motion vector.

FIG. 6 is an example of affine MVF per sub-block.

After MCP, the high accuracy motion vector of each sub-block is rounded and saved as the same accuracy as the normal motion vector.

Figure 8:
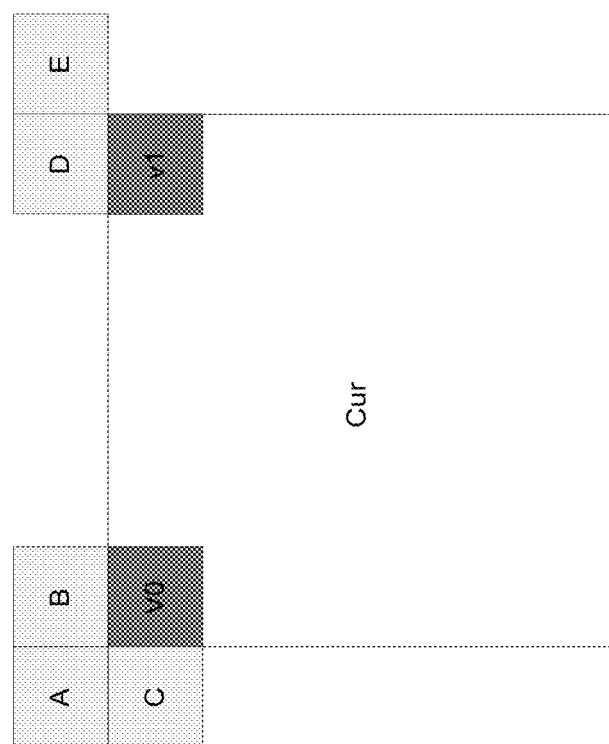
FIG. 8 shows an example of MVP for AF_INTER.

In the JEM, there are two affine motion modes: AF_INTER mode and AF_MERGE mode. For CUs with both width and height larger than 8, AF_INTER mode can be applied. An affine flag in CU level is signalled in the bitstream to indicate whether AF_INTER mode is used. In this mode, a candidate list with motion vector pair {($v_0$, $v_1$)|$v_0$={$v_A$, $v_B$, $v_C$}, $v_1$={$v_D$, $v_E$}} is constructed using the neighbour blocks. As shown in FIG. 8, $v_0$ is selected from the motion vectors of the block A, B or C. The motion vector from the neighbour block is scaled according to the reference list and the relationship among the POC of the reference for the neighbour block, the POC of the reference for the current CU and the POC of the current CU. And the approach to select $v_1$ from the neighbour block D and E is similar. If the number of candidate list is smaller than 2, the list is padded by the motion vector pair composed by duplicating each of the AMVP candidates. When the candidate list is larger than 2, the candidates are firstly sorted according to the consistency of the neighbouring motion vectors (similarity of the two motion vectors in a pair candidate) and only the first two candidates are kept. An RD cost check is used to determine which motion vector pair candidate is selected as the control point motion vector prediction (CPMVP) of the current CU. And an index indicating the position of the CPMVP in the candidate list is signalled in the bitstream. After the CPMVP of the current affine CU is determined, affine motion estimation is applied and the control point motion vector (CPMV) is found. Then the difference of the CPMV and the CPMVP is signalled in the bitstream.

FIG. 7 is an example of 4-parameter affine model (a) and 6-parameter affine model (b).

FIG. 8 is an example of MVP for AF_INTER.

In AF_INTER mode, when 4/6 parameter affine mode is used, 2/3 control points are required, and therefore 2/3 MVD needs to be coded for these control points, as shown in FIG. 7. In JVET-K0337, it is proposed to derive the MV as follows, i.e., it predicts mvd1 and mvd2 from mvd0.

$mv_0 = \overline{mv}_0 + mvd_0$ $mv_1 = \overline{mv}_1 + mvd_1 + mvd_0$ $mv_2 = \overline{mv}_2 + mvd_2 + mvd_0$ At encoder, MVD of AF_INTER are derived iteratively. Suppose such MVD derivation process is iterated by n times, then the final MVD is calculated as follows, wherein $a_i$ and $b_i$ are the estimated affine parameters, and $mvd[k]^h$ and mvd[k]$^v$ are the derived horizontal and vertical component of mvd$_k$ (k=0, 1) in the ith iteration.

$$mvd[1]^h = \sum_{i=0}^{n-1} mvd[1]_i^h = \sum_{i=0}^{n-1}(a_i * w + mvd[0]_i^h) = \quad (3)$$
$$\sum_{i=0}^{n-1} a_i * w + \sum_{i=0}^{n-1} mvd[0]_i^h = w * \sum_{i=0}^{n-1} a_i + mvd[0]^h$$

$$mvd[1]^v = \sum_{i=0}^{n-1} mvd[1]_i^v = \sum_{i=0}^{n-1}(-b_i * w + mvd[0]_i^v) = \quad (4)$$
$$-\sum_{i=0}^{n-1} b_i * w + \sum_{i=0}^{n-1} mvd[0]_i^v = -w * \sum_{i=0}^{n-1} b_i + mvd[0]^v$$

With JVET-K0337, i.e., predicting mvd$_1$ from mvd$_0$, now actually only $$\left( w * \sum_{i=0}^{n-1} a_i, -w * \sum_{i=0}^{n-1} b_i \right)$$

is encoded for mvd$_1$.

Figure 9:
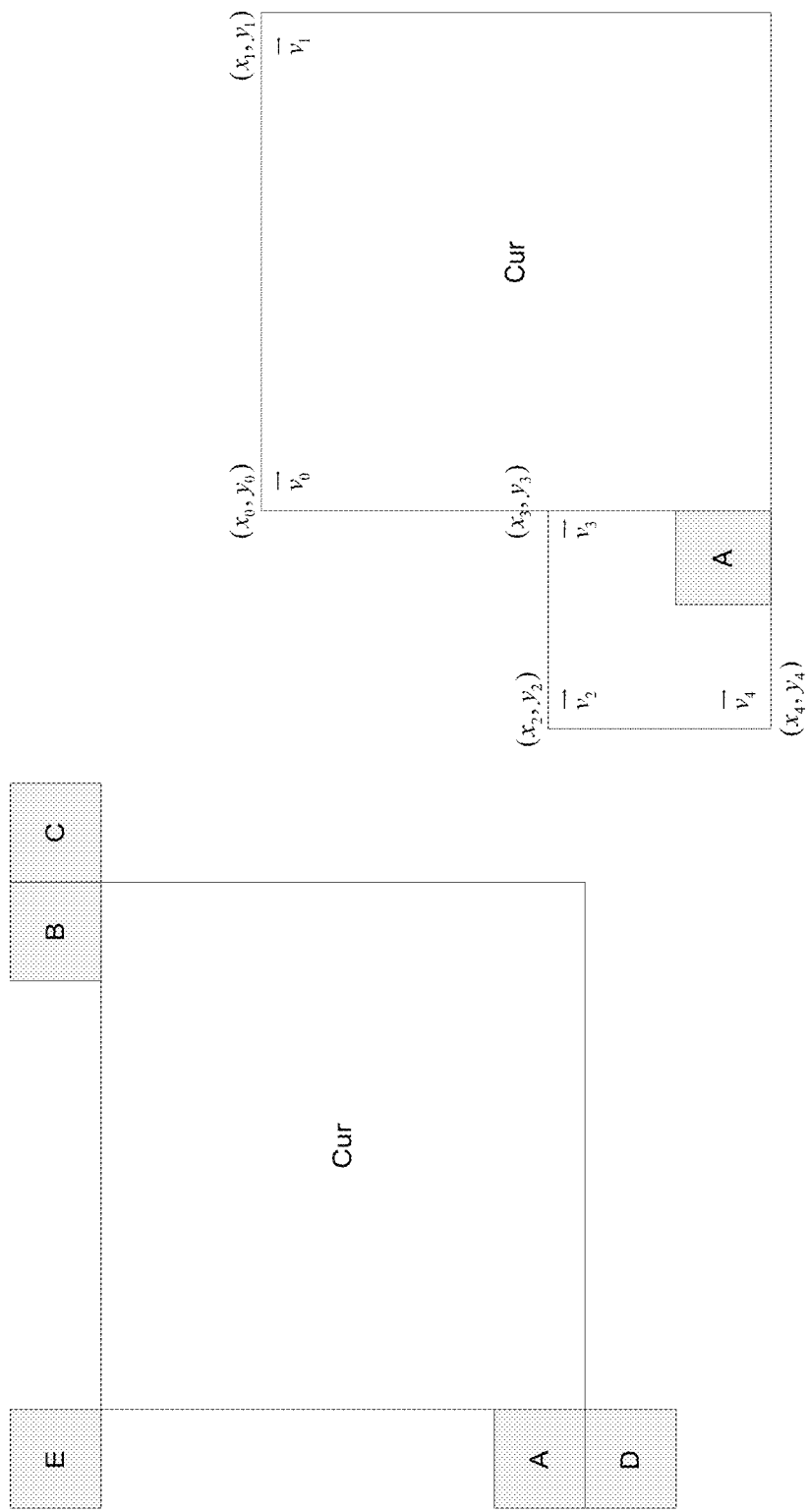
FIG. 9 shows an example of candidates for AF_MERGE.

When a CU is applied in AF_MERGE mode, it gets the first block coded with affine mode from the valid neighbour reconstructed blocks. And the selection order for the candidate block is from left, above, above right, left bottom to above left as shown in FIG. 9.a. If the neighbour left bottom block A is coded in affine mode as shown in FIG. 9.b, the motion vectors v$_2$, v$_3$ and v$_4$ of the top left corner, above right corner and left bottom corner of the CU which contains the block A are derived. And the motion vector v$_0$ of the top left corner on the current CU is calculated according to v$_2$, v$_3$ and v$_4$. Secondly, the motion vector v$_1$ of the above right of the current CU is calculated.

After the CPMV of the current CU v$_0$ and v$_1$ are derived, according to the simplified affine motion model Equation 1, the MVF of the current CU is generated. In order to identify whether the current CU is coded with AF_MERGE mode, an affine flag is signalled in the bitstream when there is at least one neighbour block is coded in affine mode.

FIG. 9 is an example of candidates for AF_MERGE.

2.6 Intra Block Copy

Decoder Aspect:

In this approach [5], the current (partially) decoded picture is considered as a reference picture. This current picture is put in the last position of reference picture list 0. Therefore, for a slice using the current picture as the only reference picture, its slice type is considered as a P slice. The bitstream syntax in this approach follows the same syntax structure for inter coding while the decoding process is unified with inter coding. The only outstanding difference is that the block vector (which is the motion vector pointing to the current picture) always uses integer-pel resolution.

Changes from Block Level CPR_Flag Approach are:

In encoder search for this mode, both block width and height are smaller than or equal to 16.

Enable chroma interpolation when luma block vector is an odd integer number.

Enable adaptive motion vector resolution (AMVR) for CPR mode when the SPS flag is on. In this case, when AMVR is used, a block vector can switch between 1-pel integer and 4-pel integer resolutions at block level.

Encoder Aspect:

The encoder performs RD check for blocks with either width or height no larger than 16. For non-merge mode, the block vector search is performed using hash-based search first. If there is no valid candidate found from hash search, block matching based local search will be performed.

In the hash-based search, hash key matching (32-bit CRC) between the current block and a reference block is extended to all allowed block sizes. The hash key calculation for every position in current picture is based on 4×4 blocks. For the current block of a larger size, a hash key matching to a reference block happens when all its 4×4 blocks match the hash keys in the corresponding reference locations. If multiple reference blocks are found to match the current block with the same hash key, the block vector costs of each candidates are calculated and the one with minimum cost is selected.

In block matching search, the search range is set to be 64 pixels to the left and on top of current block.

Figure 10:
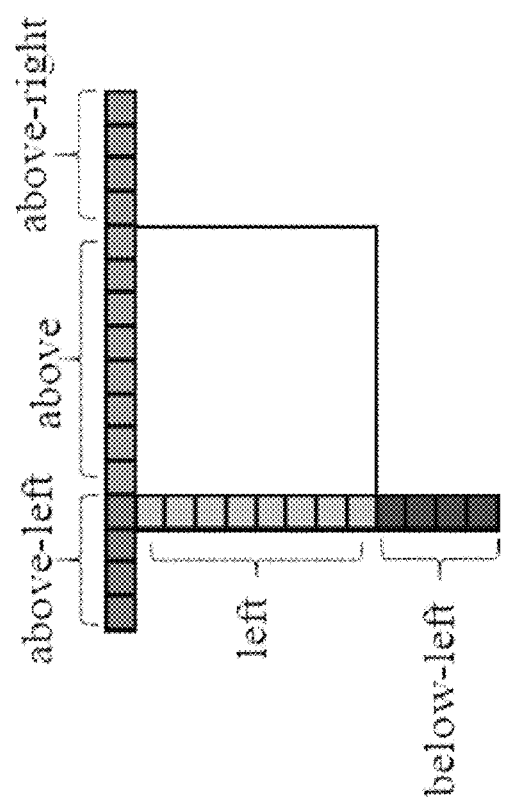
FIG. 10 shows an example of neighboring blocks of the current block.

FIG. 10 is an example of neighboring blocks of a current block.

3. Examples of Problems Solved by Embodiments

OBMC is always performed in subblock level even when current PU/CU is not coded in subblock mode, which increases the bandwidth and computational complexity. Meanwhile, fixed 4×4 subblock size is used and this also causes bandwidth issue.

4. Examples of Embodiments

To address the problem, performing OBMC at larger block size or adaptive subblock size can be done. Meanwhile, motion compensation may be performed only once in terms of one prediction direction in some of the proposed methods.

The techniques listed below should be considered as examples to explain general concepts. These techniques should not be interpreted in a narrow way. Furthermore, these inventions can be combined in any manner. It is proposed that whether to and how to apply deblocking filter may depend on whether dependent scalar quantization is used or not.

1. It is proposed that all sub-blocks within current block utilize the same motion information associated with one representative neighboring block during the OBMC process.
    a. Alternatively, two representative neighboring blocks may be selected. For example, one representative block is selected from above neighboring blocks, and another one is selected from left neighboring blocks.
    b. Alternatively, furthermore, the neighboring blocks may also be located in different pictures in addition to spatial neighboring blocks.
    c. In one example, such a method is only applied when current block is not coded with sub-block technologies (e.g., ATMVP, affine).
2. When decoding a video unit (e.g., a block or sub-block), the derived motion information from bitstream may be further modified based on motion information of neighboring blocks, and the modified motion information may be used to derive the final prediction block of the video unit.
    a. In one example, one representative neighboring block may be selected and its motion information may be used together with the motion information of current unit to derive the modified motion information.
    b. Alternatively, motion information of multiple representative neighboring blocks may be selected.
    c. In one example, furthermore, each of the selected motion information may be firstly scaled to the same reference picture (e.g., for each prediction direction) of the current video unit, then the scaled MV (denoted as neigScaleMvLX) and MV of the current video unit (denoted as currMvLX) may be jointly used to derive final MVs (e.g., using weighted averaged) for MC of the video unit.
   i. When multiple sets of motion information are selected, neigScaleMvLX may derived from multiple scaled motion vectors, e.g., using weighted average or average of all scaled motion vectors.
   ii. In one example, the averaged MV denoted as avgMv is calculated as: avgMv=(w1*neigScaleMvLX+w2*currMvLX+offset)>>N, wherein w1, w2, offset and N are integer number.
      1. In one example, w1 and w2 are equal to 1 and 3 respectively, and N is 2, offset is 2.
      2. In one example, w1 and w2 are equal to 1 and 7 respectively, and N is 3, offset is 4.
d. In one example, the proposed method is applied to the boundary region of the current block, e.g., the top several rows and/or left several columns of the current block.
   i. In one example, neigScaleMvLX is generated with different representative neighboring blocks for the above boundary region and/or left boundary region of the block, and two different neigScaleMvLX may be generated for the above boundary region and the left boundary region. For the top-left boundary region, anyone of the two neigScaleMvLX may be used.
e. In one example, the proposed method is performed at subblock level. avgMv is derived for each subblock and is used for motion compensation of the subblock.
f. In one example, the proposed method is performed at subblock level only when the current block is coded in subblock mode, like ATMVP, STMVP, affine mode etc.
g. In one example, one of the multiple neighbouring block is selected, noted as representative neighboring block and its motion information may be utilized to derive the final MVs. Alternatively, M neighbouring blocks may be selected as representative neighboring blocks, e.g., M=2, one neighboring block from those above the current block and one neighboring block from those left to the current block.
h. In one example, for a boundary region of the block or for a M×N (e.g., 4×4) small region within the boundary region, if its representative neighboring block is intra coded, proposed method may not be performed.
i. In one example, for a boundary region of the block, if its representative neighboring block is intra coded, more adjacent and/or non-adjacent blocks are checked until one inter-coded block is found, if there is no available inter-coded block, such method is disabled.
   i. In one example, non-adjacent blocks include above or/and above-left, or/and above-right neighboring blocks for top boundary blocks of the CU, and non-adjacent blocks include left or/and above-left or/and below-left neighboring blocks for left boundary blocks of the CU as shown in FIG. 10.
   ii. In one example, non-adjacent blocks include above or/and above-left and/or above-right or/and left or/and above-left neighboring blocks.
   iii. In one example, non-adjacent blocks are checked in descending order of the distance between them and the corresponding boundary block.
   iv. In one example, only some of the non-adjacent blocks are checked.
   v. In one example, no more than K non-adjacent blocks are checked.
   vi. In one example, width of the above-right and above-left area is W/2, and height of the below-left area is H/2, wherein W and H are the width and height of the CU.
j. In one example, for a boundary region of the block, if both its representative neighboring/non-adjacent block and the current block are bi-predicted or uni-predicted from one same reference list, such method is performed in each valid prediction direction.
k. In one example, for a boundary region of the block, if its representative neighboring/non-adjacent block is uni-predicted, for example predicted from list LX, and the current CU is bi-predicted or vice versa, then such method is only performed for list LX.
   i. Alternatively, MV averaging is not performed.
l. In one example, for a boundary region of the block, if both its representative neighboring/non-adjacent block and the current block are uni-predicted and they are predicted from different directions, such method is not performed.
   i. Alternatively, MV of the neighboring/non-adjacent block is scaled to the reference picture of the current block and the MV averaging is performed.
3. It is proposed that motion information of one or multiple representative neighboring blocks may be jointly used to generate additional prediction block (denoted as neigPredLX) of a video unit (block or sub-block). Suppose the prediction block generated with currMvLX is currPredLX, neigPredLX and currPredLX may be used jointly to generate the final prediction block of the video unit.
   a. In one example, the motion information of multiple representative neighboring blocks may be firstly scaled to the same reference picture (e.g., for each prediction direction) of the current video unit, then the scaled MVs are jointly used (e.g., average/weighted average) to derive neigScaleMvLX. And neigPredLX is generated based on neigScaleMvLX.
   b. In one example, the proposed method is applied to the boundary region of the current block, e.g., the top several rows and/or left several columns of the current block.
      i. In one example, neigScaleMvLX is generated with different representative neighboring blocks for the above boundary region and left boundary region of the block, and two different neigScaleMvLX may be generated for the above boundary region and the left boundary region. For the top-left boundary region, anyone of the two neigScaleMvLX may be used.
   c. In one example, the MV scaling process may be skipped.
   d. In one example, the proposed method is performed at subblock level only when the current block is coded in subblock mode, like ATMVP, STMVP, affine mode etc.
4. It is proposed that subblock size used in OBMC or proposed method may depend on the block size, block shape, motion information, reference picture of the current block (suppose size of the current block is w×h).

a. In one example, subblock size M1×M2 is used for blocks with w×h>=T, and subblock size N1×N2 is used for other blocks.
b. In one example, width/height of the subblock is set to M1 if w>=T; otherwise, width/height of the subblock is set to N1.
c. In one example, subblock size M1×M2 is used for uni-predicted block and subblock size N1×N2 is used for other blocks.
d. In one example, M1×M2 is 4×4.
e. In one example, M1×M2 is w/4×4 for the above region, and 4×h/4 for the left region.
f. In one example, M1×M2 is w/4×2 for the above region, and 4×h/2 for the left region.
g. In one example, N1×N2 is 8×8 or 8×4 or 4×8.
h. In one example, N1×N2 is w/2×4 for the above region, and 4×h/2 for the left region.
i. In one example, N1×N2 is w/2×2 for the above region, and 2×h/2 for the left region.
5. The proposed methods or OBMC may be applied to certain modes, block sizes/shapes, and/or certain sub-block sizes.
a. The proposed methods may be applied to certain modes, such as conventional translational motion (i.e., affine mode is disabled).
b. The proposed methods may be applied to certain block sizes.
i. In one example, it is only applied to a block with w×h>=T, where w and h are the width and height of the current block, e.g. T is 16 or 32.
ii. In another example, it is only applied to a block with w>=T && h>=T, e.g. T is 8.
iii. Alternatively, it is only applied to a block with w>=T1 && h>=T2, e.g. T1 and T2 are equal to 8.
iv. Alternatively, in addition, it is not applied to a block with w>=T1 and/or h>=T2. For example, T1 and T2 are equal to 128.
c. Usage of the proposed method may be invoked under further conditions, e.g., based on block sizes/block shapes/coded modes/slice types/low delay check flags/temporal layers etc. al.
6. It is proposed that OBMC may be applied to a video unit (e.g., block or sub-block) if it is coded with the intra block copy (IBC) mode.
a. In one example, it is invoked only when one or multiple representative neighboring blocks are coded in intra block copy mode. Alternatively, furthermore, only motion information from such neighboring blocks are used in OBMC.
b. In one example, if one block is coded with sub-block technologies (e.g., ATMVP) and some of the sub-blocks are coded with IBC mode, OBMC may be still applied to the non-IBC coded sub-blocks. Alternatively, OBMC may be disabled for the whole block.
c. Alternatively, OBMC is disabled in intra block copy mode.
7. The proposed methods may be applied on all color components. Alternatively, they may be applied only to some color components. For example, they may be only applied on the luma component.
8. Whether to and how to apply the proposed methods can be signaled from the encoder to the decoder in VPS/SPS/PPS/picture header/tile groups/slice header/CTU/CU/group of CTUs/group of CUs.

Figure 11:
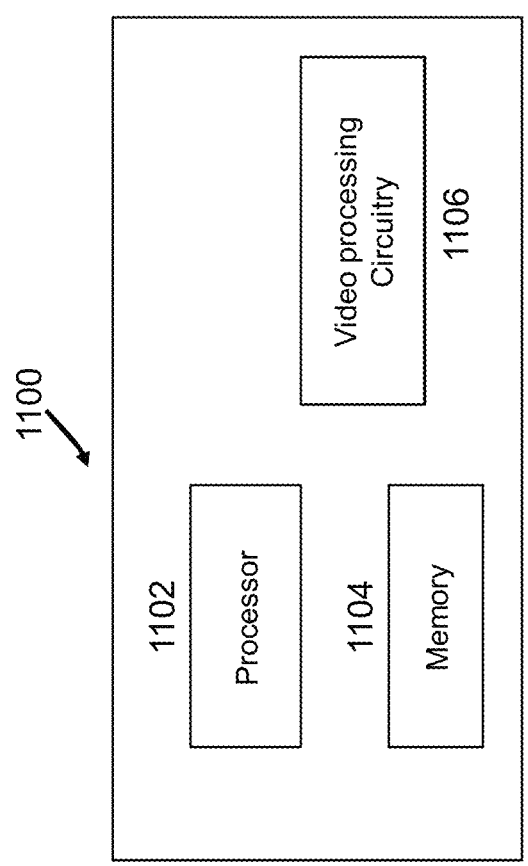
FIG. 11 is a block diagram of an example of a video processing apparatus.

FIG. 11 is a block diagram of a video processing apparatus 1100. The apparatus 1100 may be used to implement one or more of the methods described herein. The apparatus 1100 may be embodied in a smartphone, tablet, computer, Internet of Things (IoT) receiver, and so on. The apparatus 1100 may include one or more processors 1102, one or more memories 1104 and video processing hardware 1106. The processor(s) 1102 may be configured to implement one or more methods described in the present document. The memory (memories) 1104 may be used for storing data and code used for implementing the methods and techniques described herein. The video processing hardware 1106 may be used to implement, in hardware circuitry, some techniques described in the present document.

Figure 13:
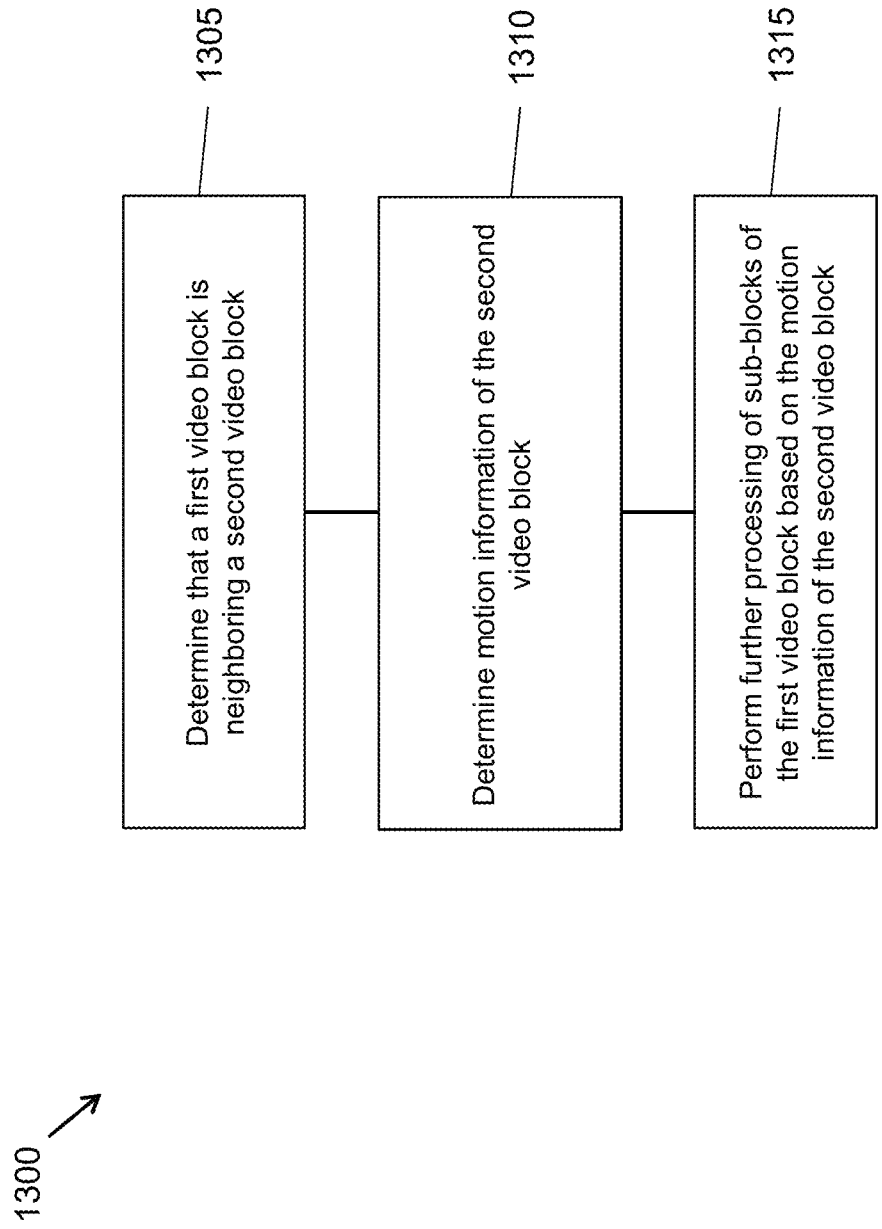
FIG. 13 is a flowchart for an example of a video processing method.

FIG. 13 is a flowchart for a method 1300 of processing a video. The method 1300 includes determining (1305) that a first video block is neighboring a second video block, determining (1310) motion information of the second video block, and performing (1315) further processing of sub-blocks of the first video block based on the motion information of the second video block.

Figure 14:
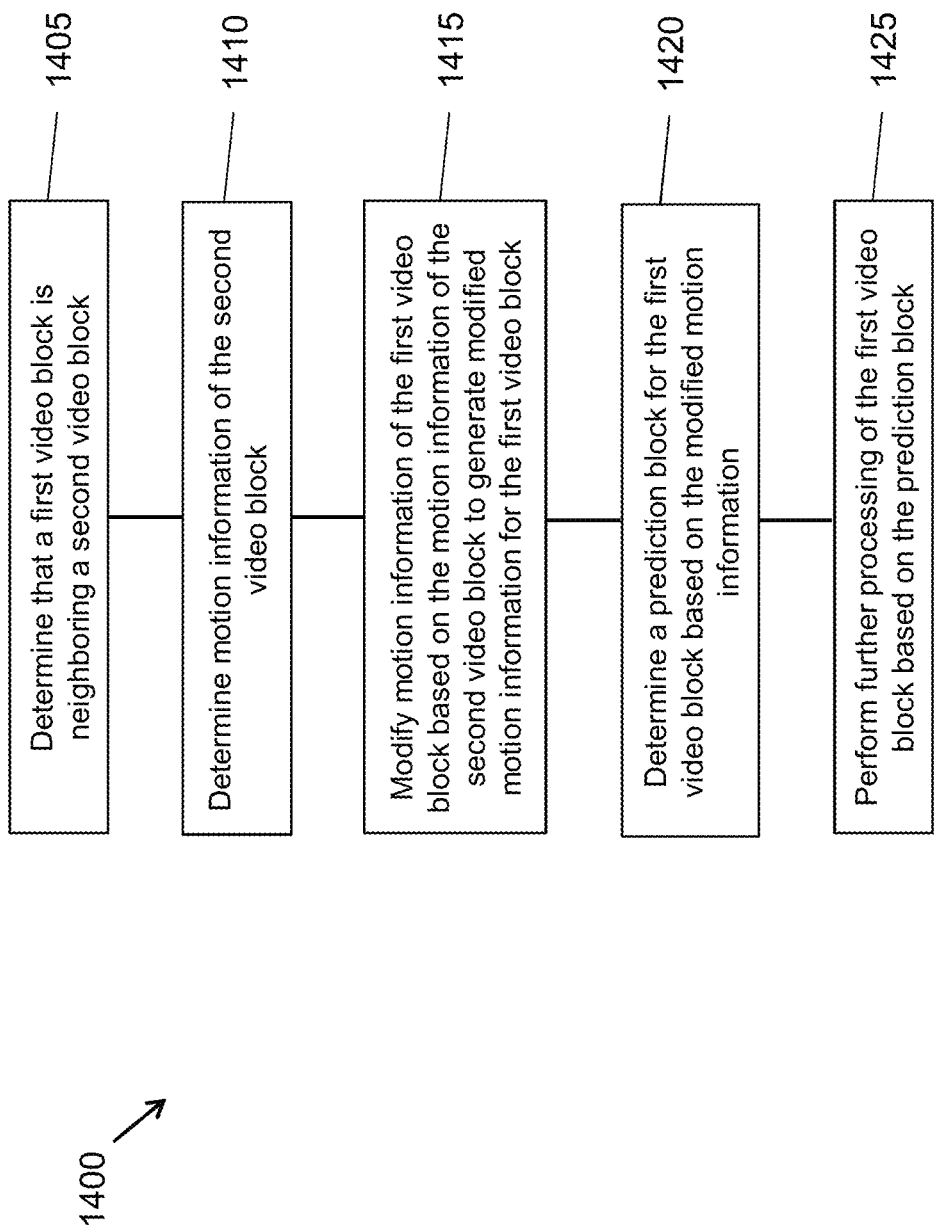
FIG. 14 is a flowchart for an example of a video processing method.

FIG. 14 is a flowchart for a method 1400 of processing a video. The method 1400 includes determining (1405) that a first video block is neighboring a second video block, determining (1410) motion information of the second video block, modifying (1415) motion information of the first video block based on the motion information of the second video block to generate modified motion information for the first video block, determining (1420) a prediction block for the first video block based on the modified motion information, and performing (1425) further processing of the first video block based on the prediction block.

Figure 15:
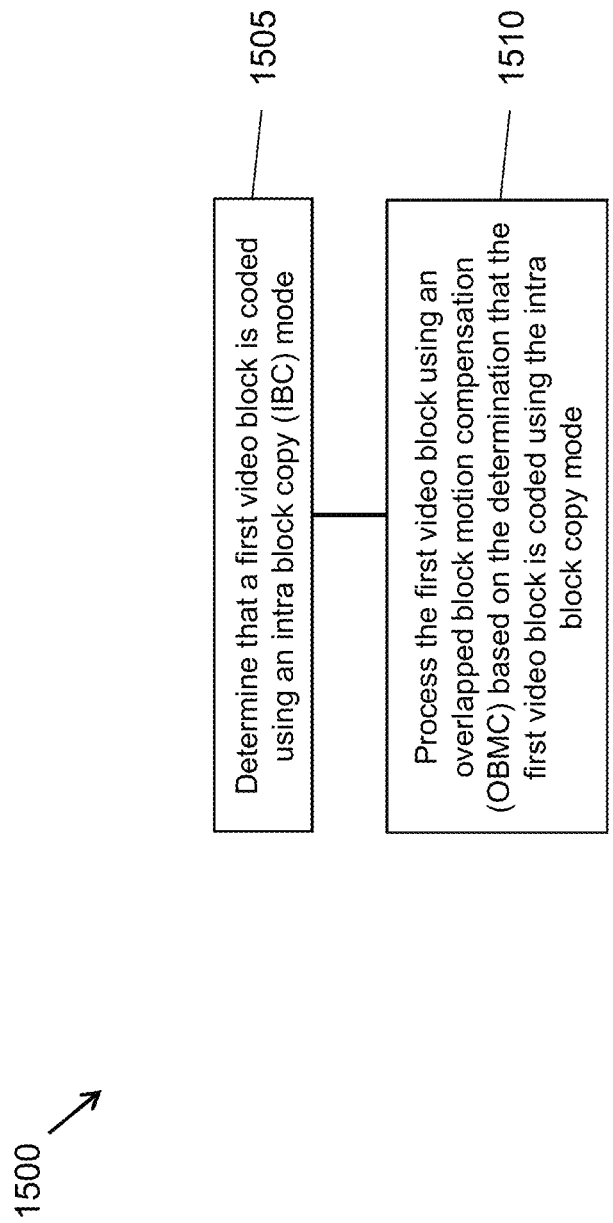
FIG. 15 is a flowchart for an example of a video processing method.

FIG. 15 is a flowchart for a method 1500 of processing video. The method 1500 includes determining (1505) that a first video block is coded using an intra block copy (IBC) mode, and processing (1510) the first video block using an overlapped motion compensation (OBMC) based on the determination that the first video block is coded using the intra block copy mode.

With reference to methods 1300, 1400, and 1500, some examples of determining a candidate for encoding and their use are described in Section 4 of the present document. For example, as described in Section 4, sub-blocks of a first video block can be processed based on motion information of a second video block that is neighboring the first video block.

With reference to methods 1300, 1400, and 1500, a video block may be encoded in the video bitstream in which bit efficiency may be achieved by using a bitstream generation rule related to motion information prediction.

The methods can include determining, by the processor, that the first video block is neighboring a third video block; and determining, by the processor, motion information of the third video block, wherein the performing further processing of the sub-blocks of the first video block is based on the motion information of the third video block, one of the second video block or the third video block being positioned above the first video block, the other being positioned to the left of the first video block.

The methods can include wherein the first video block is from a first picture, and the second video block is from a second picture, the first picture and the second picture being different pictures.

The methods can include wherein the first video block and the second video block are within a same picture.

The methods can include wherein the method is applied based on the first video block not being coded with a sub-block technology.

The methods can include wherein the modified motion information is also based on motion information of a third video block that is neighboring the first video block.

The methods can include wherein the motion information of the second video block and the motion information of the first video block are scaled based on a reference picture related to the first video block, the modifying being based on the scaled motion information.

The methods can include wherein the scaled motion information is based on a weighted average or an average of scaled motion vectors from the scaled motion information.

The methods can include wherein the average of the scaled motion vectors is calculated based on avgMv=(w1*neigScaleMvLX+w2*currMvLX+offset)>>N, wherein w1, w2, offset and N are integer numbers, wherein avgMv is the average of the scaled motion vectors, neigScaleMvLX is a scaled motion vector, and currMvLX is a motion vector of the first video block.

The methods can include wherein w1 is 1, w2 is 3, N is 2, and offset is 2.

The methods can include wherein w1 is 1, w2 is 7, N is 3, and offset is 4.

The methods can include wherein the method is applied to a boundary region of the first video block, the boundary region including multiple rows of blocks above the first video block, and the boundary region including multiple columns of blocks to the left of the first video block.

The methods can include wherein neigScaleMvLX is based on a first neigScaleMvLX related to the multiple rows of blocks above the first video within the boundary region and based on a second neigScaleMvLX related to the multiple columns of blocks to the left of the first video block within the boundary region.

The methods can include wherein one or both of the first neigScaleMvLX or the second neigScaleMvLX are used for a top-left boundary region of the first video block.

The methods can include wherein the method is performed at a sub-block level, and avgMv is based on sub-blocks at the sub-block level, wherein motion compensation for the sub-blocks is based on avgMv.

The methods can include wherein the method is performed at the sub-block level based on the first video block being coded in a sub-block mode.

The methods can include determining a motion vector for the first video block is based on the motion information of the second video block.

The methods can include wherein the motion vector for the first video block is also based on motion information of a third video block, one of the second video block or the third video block positioned above the first video block, the other positioned to the left of the first video block.

The methods can include wherein the method is not performed if the second video block is intra coded.

The methods can include determining, by the processor, that the second video block is within a boundary region; determining, by the processor, that the second video block is intra-coded; identifying, by the processor, a third video block within the boundary region that is inter-coded, the third video block being adjacent or non-adjacent to the first video block; and performing further processing of the first video block based on the third video block.

The methods can include wherein the boundary region includes one or more of: non-adjacent blocks that are above, above-left, or above-right top boundary video blocks of the boundary region, and the non-adjacent blocks include one or more of: left, above-left, or below-left left boundary blocks of the boundary region.

The methods can include wherein the non-adjacent blocks include one or more of: above, above-left, above-right, left, or above-left video blocks of the boundary region.

The methods can include wherein the non-adjacent blocks are checked in a descending order based on a distance between the non-adjacent blocks and a video block within the boundary region to identify the third video block.

The methods can include wherein a sub-set of the non-adjacent blocks are checked to identify the third video block.

The methods can include wherein a number of the non-adjacent blocks that are checked to identify the third video block is less than or equal to a threshold number K.

The methods can include wherein a width of an above-right and an above-left area is W/2, and a height of a below-left area is H/2, wherein W and H are the width and height of the first video block, the first video block being a coding unit.

The methods can include determining that the first video block and the third video block are bi-predicted or uni-predicted from a reference list, wherein the method is performed in each valid prediction direction.

The methods can include wherein the third video block is uni-predicted, the first video block is bi-predicted.

The methods can include wherein the third video block is bi-predicted, the first video block is uni-predicted.

The methods can include wherein motion vector averaging is not performed.

The methods can include determining that the third video block and the first video block are uni-predicted and predicted from different directions, wherein the method is not performed based on the determination.

The methods can include wherein a motion vector of the third video block is scaled to a reference picture of the first video block and motion vector averaging is performed.

The methods can include determining motion information of one or more neighboring blocks of the first video block; and determining a prediction block for the first video block based on the motion information of the one or more neighboring blocks.

The methods can include wherein the motion information of the one or more neighboring blocks is scaled to a reference picture of the first video block to generate a scaled motion information including scaled motion vectors, the scaled motion vectors used to determine the prediction block.

The methods can include wherein the method is applied to a boundary region of the first video block.

The methods can include wherein neigScaleMvLX is based on different neighboring blocks for the above boundary region and left boundary region of the first video block, and two different neigScaleMvLX are based on the above boundary region and the left boundary region, wherein any of the two neigScaleMvLX are used for the top-left boundary region.

The methods can include wherein a motion vector scaling process is skipped.

The methods can include wherein the method is performed at a sub-block level based on the first block being coded in a sub-block mode.

The methods can include wherein a sub-block size is based on block size, block shape, motion information, or reference picture of the first video block.

The methods can include wherein the sub-block size is M1×M2 for blocks with a width×height greater than or equal to T, and the sub-block size is N1×N2 for blocks without a width×height greater than or equal to T.

The methods can include wherein a width divided by height of a sub-block is M1 based on a width of a block being greater than or equal to T, and the width divided by height of a sub-block is N1 if the width of a block is not greater than or equal to T.

The methods can include wherein the sub-block size is M1×M2 for uni-predicted block and a sub-block size N1×N2 is used for other blocks.

The methods can include wherein M1×M2 is 4×4.

The methods can include wherein M1×M2 is w/4×4 for the above region, and 4×h/4 for the left region.

The methods can include wherein M1×M2 is w/4×2 for the above region, and 4×h/2 for the left region.

The methods can include wherein N1×N2 is 8×8, 8×4, or 4×8.

The methods can include wherein N1×N2 is w/2×4 for the above region, and 4×h/2 for the left region.

The methods can include wherein N1×N2 is w/2×2 for the above region, and 2×h/2 for the left region.

The methods can include wherein the method is applied to a conventional translational motion mode.

The methods can include wherein the first video block has a width×height greater than or equal to T, and T is 16 or 32.

The methods can include wherein the first video block has a width greater than or equal to T, and a height greater than or equal to T, and T is 8.

The methods can include wherein the first video block has a width greater than or equal to T1, and a height greater than or equal to T2, and T1 and T2 are 8.

The methods can include wherein the method is not applied to a video block with a width greater than or equal to T1 or a height greater than or equal to T2, T1 and T2 being 128.

The methods can include wherein the method is performed based on determining a condition based on one or more of: block size, block shape, coding mode, slice type, low delay check flag, or temporal layers.

The methods can include determining that one or multiple neighboring blocks of the first video block are coded using the intra block copy mode, wherein processing the first video block using the OBMC is based on the determination that the one or multiple neighboring blocks of the first video block are coded in intra block copy mode.

The methods can include determining that the first video block includes sub-blocks that are coded with the IBC mode; and processing sub-blocks of the first video block that are not coded with IBC mode with the OBMC.

The methods can include determining that the first video block includes sub-blocks that are coded with the IBC mode; and processing the sub-blocks without using the OBMC based on the sub-blocks being coded with the IBC mode.

The methods can include wherein the methods are applied on one or more color components.

The methods can include wherein the methods are applied to the luma component.

The methods can include wherein the method is applied based on a signal from an encoder to a decoder, the signal provided via a video parameter set (VPS), a sequence parameter set (SPS), a picture parameter set (PPS), a picture header, a tile group, a slice header, a coding tree unit (CTU), a coding unit (CU), a group of CTUs, or a group of CUs.

It will be appreciated that the disclosed techniques may be embodied in video encoders or decoders to improve compression efficiency when the coding units being compressed have shaped that are significantly different than the traditional square shaped blocks or rectangular blocks that are half-square shaped. For example, new coding tools that use long or tall coding units such as 4×32 or 32×4 sized units may benefit from the disclosed techniques.

Figure 16:
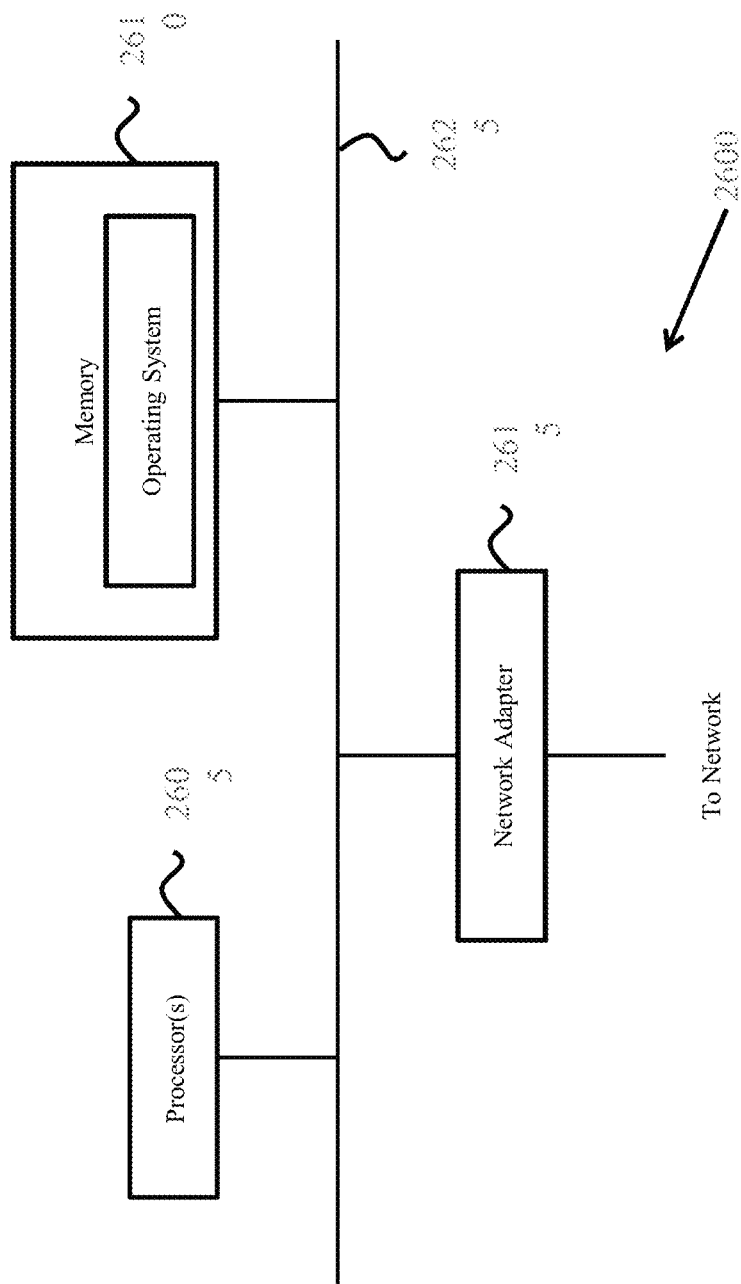
FIG. 16 shows an example hardware platform for implementing some disclosed methods.

FIG. 16 is a block diagram illustrating an example of the architecture for a computer system or other control device 2600 that can be utilized to implement various portions of the presently disclosed technology. In FIG. 16, the computer system 2600 includes one or more processors 2605 and memory 2610 connected via an interconnect 2625. The interconnect 2625 may represent any one or more separate physical buses, point to point connections, or both, connected by appropriate bridges, adapters, or controllers. The interconnect 2625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 2605 may include central processing units (CPUs) to control the overall operation of, for example, the host computer. In certain embodiments, the processor(s) 2605 accomplish this by executing software or firmware stored in memory 2610. The processor(s) 2605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 2610 can be or include the main memory of the computer system. The memory 2610 represents any suitable form of random access memory (RAM), read-only memory (ROM), flash memory, or the like, or a combination of such devices. In use, the memory 2610 may contain, among other things, a set of machine instructions which, when executed by processor 2605, causes the processor 2605 to perform operations to implement embodiments of the presently disclosed technology.

Also connected to the processor(s) 2605 through the interconnect 2625 is a (optional) network adapter 2615. The network adapter 2615 provides the computer system 2600 with the ability to communicate with remote devices, such as the storage clients, and/or other storage servers, and may be, for example, an Ethernet adapter or Fiber Channel adapter.

Figure 17:
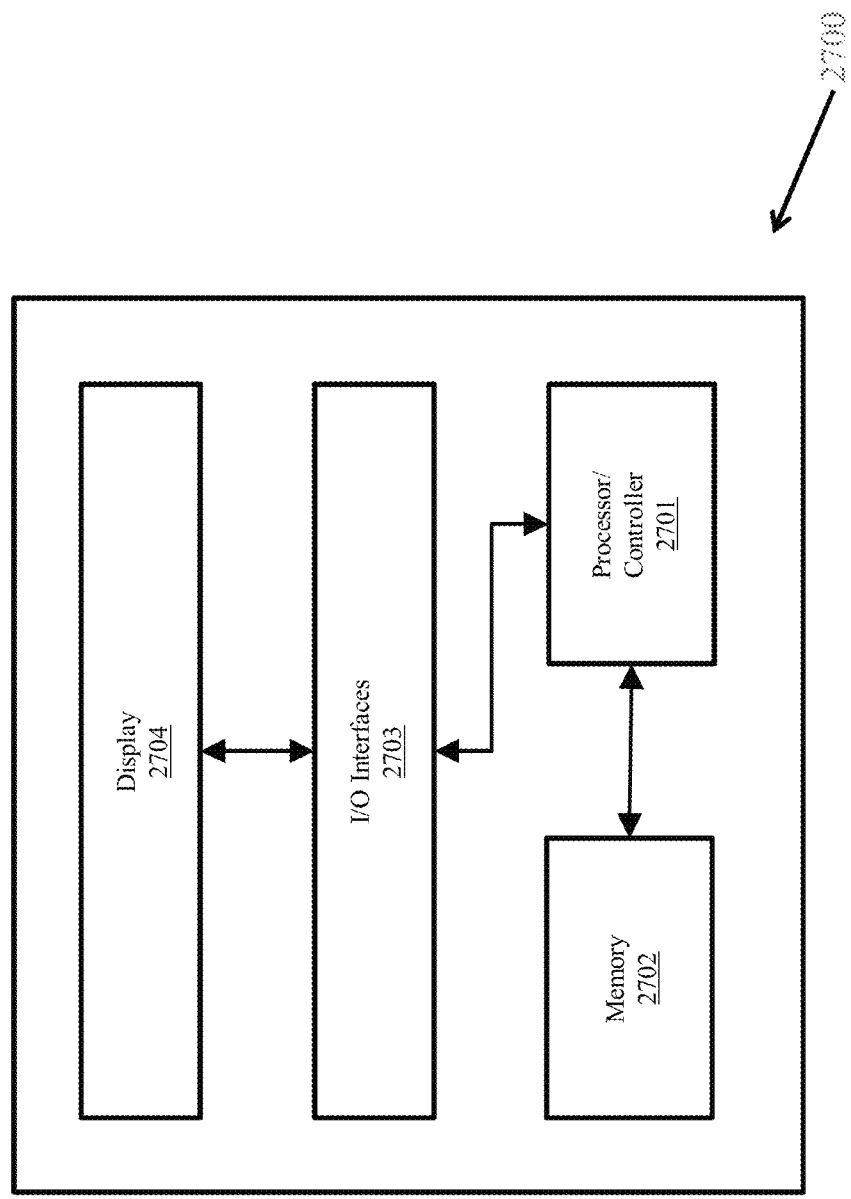
FIG. 17 shows another example hardware platform for implementing some disclosed methods.

FIG. 17 shows a block diagram of an example embodiment of a device 2700 that can be utilized to implement various portions of the presently disclosed technology. The mobile device 2700 can be a laptop, a smartphone, a tablet, a camcorder, or other types of devices that are capable of processing videos. The mobile device 2700 includes a processor or controller 2701 to process data, and memory 2702 in communication with the processor 2701 to store and/or buffer data. For example, the processor 2701 can include a central processing unit (CPU) or a microcontroller unit (MCU). In some implementations, the processor 2701 can include a field-programmable gate-array (FPGA). In some implementations, the mobile device 2700 includes or is in communication with a graphics processing unit (GPU), video processing unit (VPU) and/or wireless communications unit for various visual and/or communications data processing functions of the smartphone device. For example, the memory 2702 can include and store processor-executable code, which when executed by the processor 2701, configures the mobile device 2700 to perform various operations, e.g., such as receiving information, commands, and/or data, processing information and data, and transmitting or providing processed information/data to another device, such as an actuator or external display. To support various functions of the mobile device 2700, the memory 2702 can store information and data, such as instructions, software, values, images, and other data processed or referenced by the processor 2701. For example, various types of Random Access Memory (RAM) devices, Read Only Memory (ROM) devices, Flash Memory devices, and other suitable storage media can be used to implement storage functions of the memory 2702. In some implementations, the mobile device 2700 includes an input/output (I/O) unit 2703 to interface the processor 2701 and/or memory 2702 to other modules, units or devices. For example, the I/O unit 2703 can interface the processor 2701 and memory 2702 with to utilize various types of wireless interfaces compatible with typical data communication standards, e.g., such as between the one or more computers in the cloud and the user device. In some implementations, the mobile device 2700 can interface with other devices using a wired connection via the I/O unit 2703. The mobile device 2700 can also interface with other external interfaces, such as data storage, and/or visual or audio display devices 2704, to retrieve and transfer data and information that can be processed by the processor, stored in the memory, or exhibited on an output unit of a display device 2704 or an external device. For example, the display device 2704 can display a video frame modified based on the MVPs in accordance with the disclosed technology.

Figure 18:
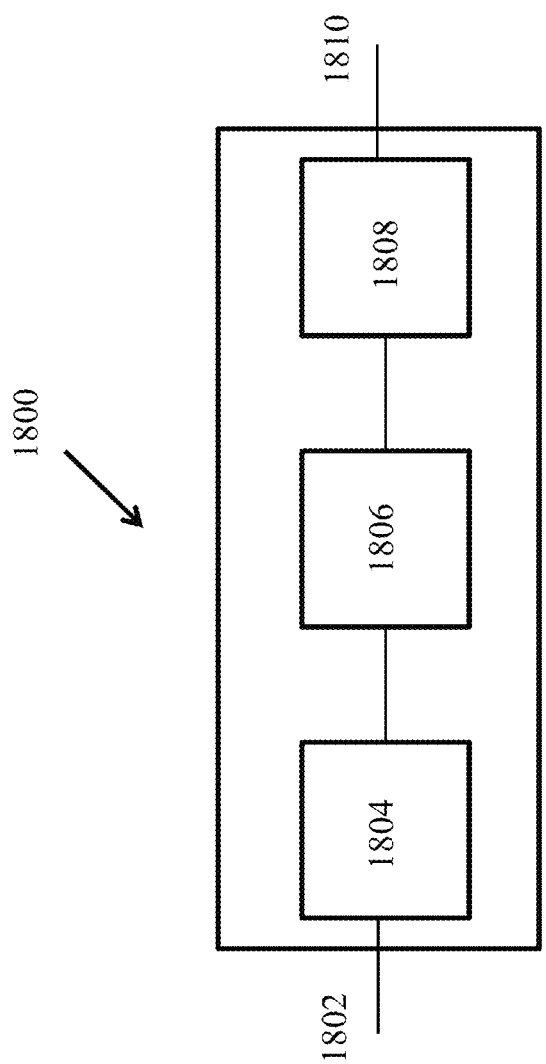
FIG. 18 is a block diagram of an example video processing system in which disclosed techniques may be implemented.

FIG. 18 is a block diagram showing an example video processing system 1800 in which various techniques disclosed herein may be implemented. Various implementations may include some or all of the components of the system 1800. The system 1800 may include input 1802 for receiving video content. The video content may be received in a raw or uncompressed format, e.g., 8 or 10 bit multi-component pixel values, or may be in a compressed or encoded format. The input 1802 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1800 may include a coding component 1804 that may implement the various coding or encoding methods described in the present document. The coding component 1804 may reduce the average bitrate of video from the input 1802 to the output of the coding component 1804 to produce a coded representation of the video. The coding techniques are therefore sometimes called video compression or video transcoding techniques. The output of the coding component 1804 may be either stored, or transmitted via a communication connected, as represented by the component 1806. The stored or communicated bitstream (or coded) representation of the video received at the input 1802 may be used by the component 1808 for generating pixel values or displayable video that is sent to a display interface 1810. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 19:
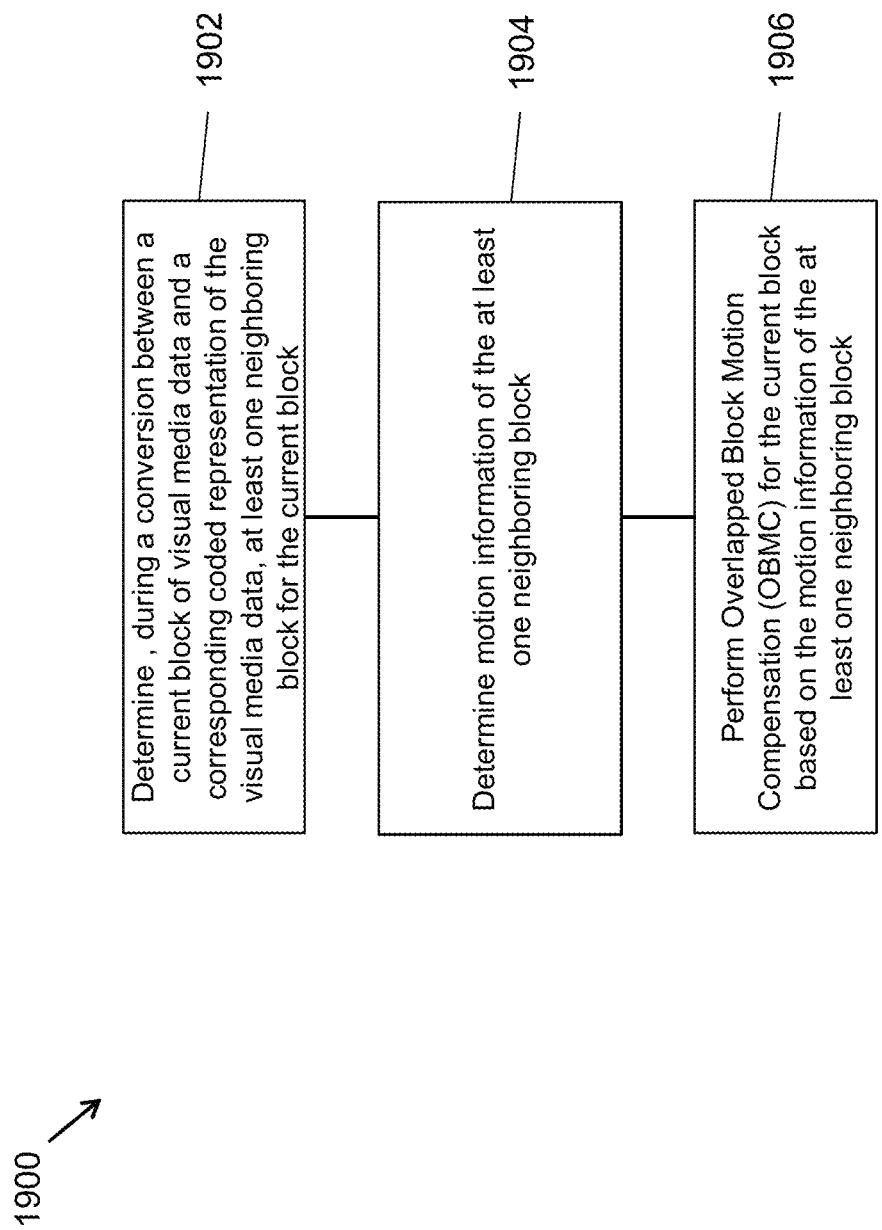
FIG. 19 is a flowchart for an example of a video processing method.

FIG. 19 is a flowchart for an example method of video processing. The method 1900 includes determining (at step 1902), during a conversion between a current block of visual media data and a corresponding coded representation of the visual media data, at least one neighboring block for the current block; determining (at step 1904) motion information of the at least one neighboring block; and performing (at step 1906) Overlapped Block Motion Compensation (OBMC) for the current block based on the motion information of the at least one neighboring block, wherein the OBMC tool includes using an intermediate prediction values of one sub-block of the current block and a prediction values of at least one neighboring sub-block to generating a final prediction values of the sub-block.

In some implementations, additional modifications can be performed to method 1900. For example, performing OBMC for the current block based on the motion information of the at least one neighboring block comprises: performing OBMC for all sub-blocks of the current block based on the motion information of the at least one neighboring block. The at least one neighboring block comprises a first neighboring block being positioned above the current block and a second neighboring block being positioned left to the current block. The at least one neighboring block and the current block are from the different pictures of the visual media data. The method is applied only when the current block is not coded with a sub-block technology.

Figure 20:
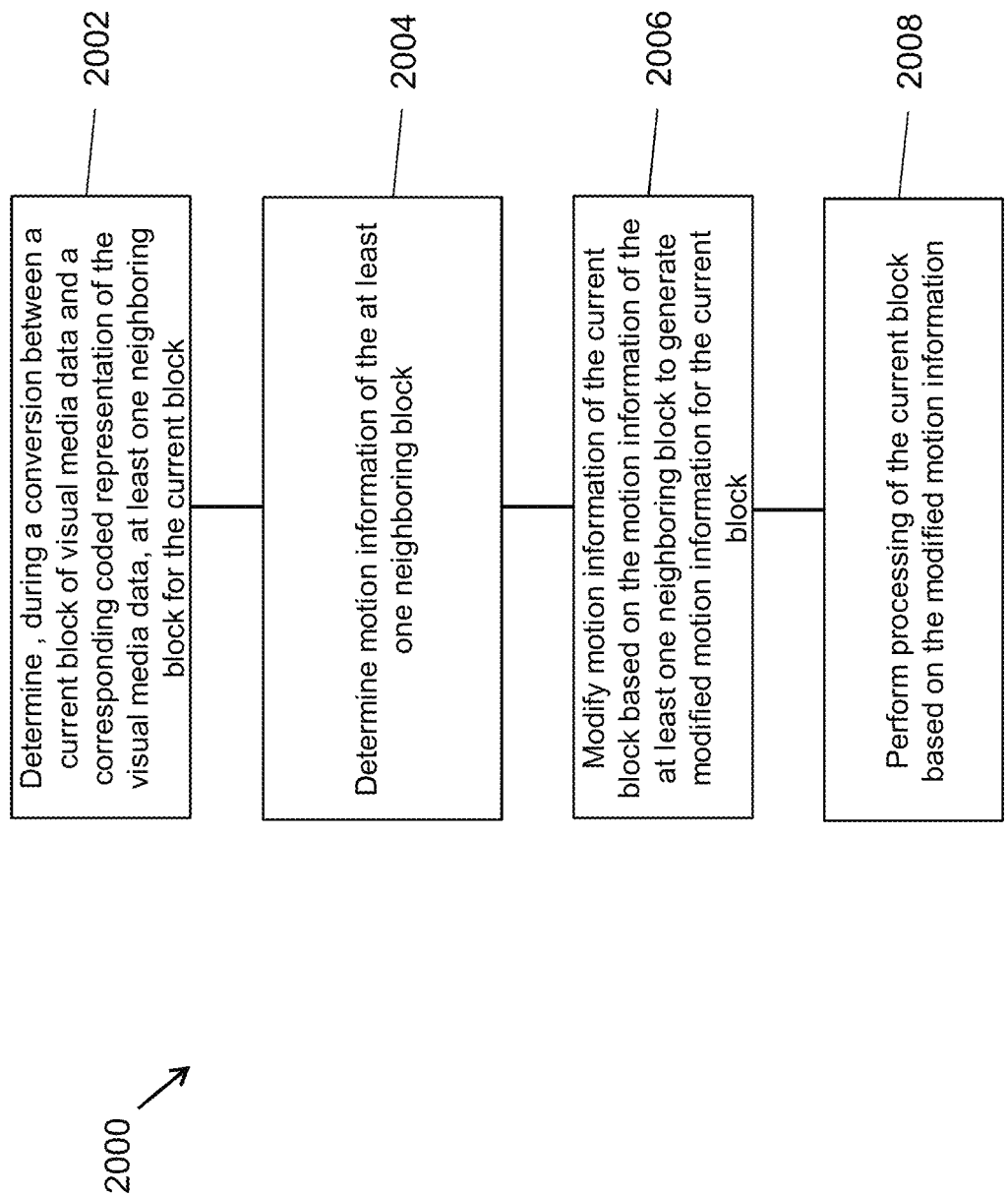
FIG. 20 is a flowchart for an example of a video processing method.

FIG. 20 is a flowchart for an example method of video processing. The method 2000 includes determining (at step 2002), during a conversion between a current block of visual media data and a corresponding coded representation of the visual media data, at least one neighboring block for the current block; determining (at step 2004) motion information of the at least one neighboring block; and modifying (at step 2006) motion information of the current block based on the motion information of the at least one neighboring block to generate modified motion information for the current block; performing (at step 2008) processing of the current block based on the modified motion information.

In some implementations, additional modifications can be performed to method 2000. For example, modifying motion information of the current block based on the motion information of the at least one neighboring block to generate modified motion information for the current block comprises: modifying motion information of the current block based on the motion information of the at least one neighboring block and the motion information of the current block to generate modified motion information for the current block. Modifying motion information of the current block comprises: scaling the motion information of the at least one neighboring block to a same reference picture of the current block, and modifying motion information of the current block based on the scaled motion information of the at least one neighboring block and the motion information of the current block. The scaled motion information of the at least one neighboring block is weighted averaged or averaged to generate one representative scaled motion vector for each reference picture list of the current block. The modified motion information of the current block is generated as the weighted average of the representative scaled motion vector and the motion vector of the current block. The modified motion vectors is calculated as: avgMv= (w1*neigScaleMvLX+w2*currMvLX+offset)>>N, wherein w1, w2, offset and N are integer numbers, wherein avgMv is the modified motion vectors, neigScaleMvLX is a representative scaled motion vector, and currMvLX is a motion vector of the current block, X is the reference picture list, wherein X=0, 1. w1 is 1, w2 is 3, N is 2, and offset is 2 or wherein w1 is 1, w2 is 7, N is 3, and offset is 4. Performing processing of the current block based on the motion information of the at least one neighboring block comprises: performing processing on boundary region of the current block, wherein the boundary region of the current block includes multiple top rows and/or left columns of the current block. The representative motion vectors are generated using different neighboring blocks for the top rows of the current block and the left columns of the current block respectively. The method is applied at a sub-block level only when the current block is coded with a sub-block technology. When the at least one neighboring block of a boundary region is intra coded, the method is not performed for the boundary region of the current block. When the at least one neighboring block is intra coded, the method further comprises: checking adjacent and/or non-adjacent blocks until one inter-coded block is found, and disable the motion vector modifying processing in response to no inter coded block found. Non-adjacent blocks include above and/or above-left, and/or above-right neighboring blocks for top boundary region of the current block, and non-adjacent blocks include left and/or above-left and/or below-left neighboring blocks for left boundary region of the current block. Non-adjacent blocks include above and/or above-left, and/or above-right, and/or left and/or above-left neighboring blocks. The non-adjacent blocks are checked in a descending order of distance between the non-adjacent blocks and a corresponding block within the boundary region. A sub-set of the non-adjacent blocks or a number of the non-adjacent blocks are checked, the number is no more than a threshold K. A width of an above-right and above-left area is W/2, and a height of a below-left area is H/2, wherein W and H are the width and height of the current block as a coding unit. When the at least one of neighboring block/non-adjacent block and the current block are bi-predicted or uni-predicted from a reference list, the method is performed in each valid prediction direction. When the at least one of neighboring block/non-adjacent block is uni-predicted from a first list and the current block is bi-predicted, or when the at least one of neighboring block/non-adjacent block is bi-predicted and the current block is uni-predicted from a first list, the modified motion information is generated for the first list. The modified motion information is not generated. When the at least one of neighboring block/non-adjacent block and the current block are uni-predicted and are predicted from different directions, the modified motion information is not generated. When the at least one of neighboring block/non-adjacent block and the current block are uni-predicted and are predicted from different directions, a motion vector of the neighboring/non-adjacent block is scaled to a reference picture of the current block and the modified motion information is generated.

Figure 21:
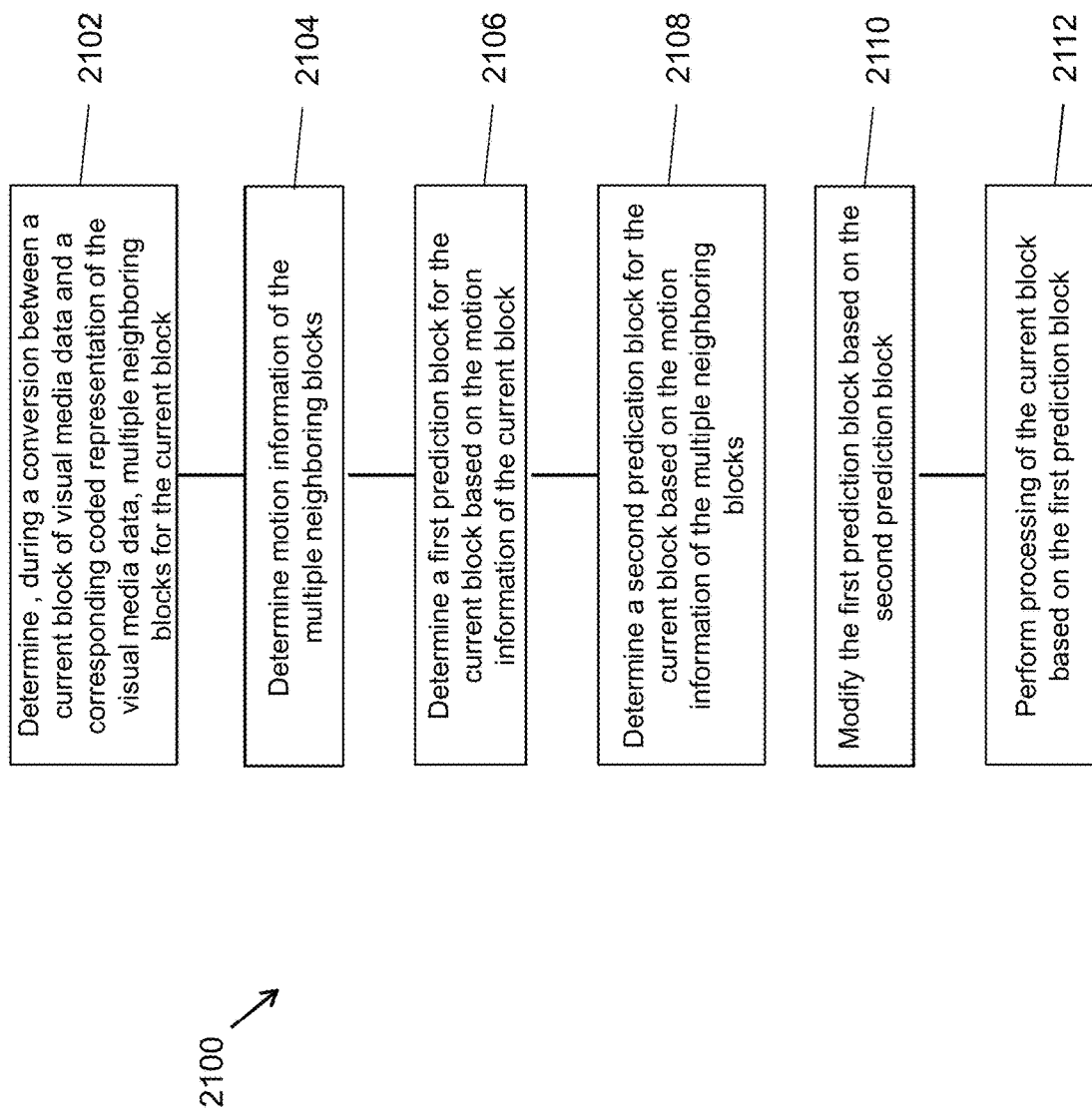
FIG. 21 is a flowchart for an example of a video processing method.

FIG. 21 is a flowchart for an example method of video processing. The method 2100 includes determining (at step 2102), during a conversion between a current block of visual media data and a corresponding coded representation of the visual media data, multiple neighboring blocks for the current block; determining (at step 2104) motion information of the multiple neighboring blocks; determining (at step 2106) a first prediction block for the current block based on the motion information of the current block; determining (at step 2108) a second predication block for the current block based on the motion information of the multiple neighboring blocks; modifying (at step 2110) the first prediction block based on the second prediction block; and performing (at step 2112) processing of the current block based on the first prediction block.

In some implementations, additional modifications can be performed to method 2100. For example, the motion information of one of the multiple neighboring block is scaled to a reference picture of the current block to generate a representative scaled motion information which is used to determine a second prediction block of the current block. Modifying the first prediction block further comprises: generating the modified prediction block as a weighted average of the first prediction block and the second prediction block. Performing processing of the current block based on the first prediction block comprises: performing processing on boundary region of the current block, wherein the boundary region of the current block includes an above boundary region with multiple top rows and/or a left boundary region with left columns of the current block. Two different representative scaled motion vectors are generated based on different neighboring blocks for the above boundary region and the left boundary region. Anyone of the two different scaled motion vectors is used for a top-left boundary region. A motion vector scaling process is skipped. Modifying the first prediction block based on the second prediction block comprises: performing processing on one of more sub-blocks of the current block based on the motion information of the at least one neighboring block. The method is applied only when the current block is coded with a sub-block technology. The sub-block technology comprises Advanced Temporal Motion Vector Prediction (ATMVP), Spatial Temporal Motion Vector Prediction (STMVP), affine mode including affine inter mode and affine merge mode.

Figure 22:
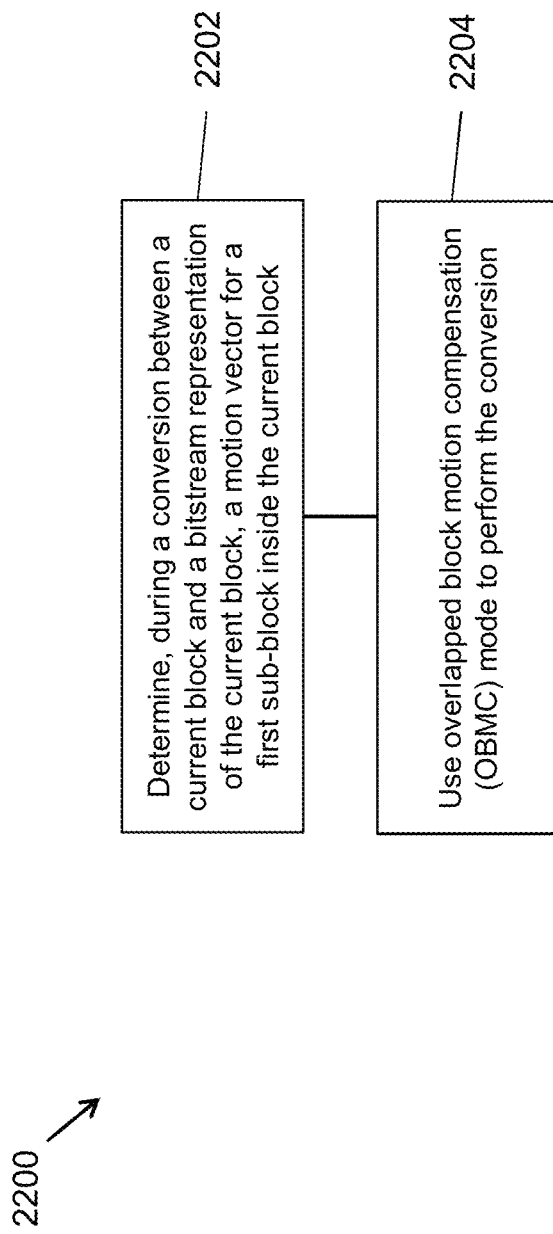
FIG. 22 is a flowchart for an example of a video processing method.

FIG. 22 is a flowchart for an example method of video processing. The method 2200 includes determining (at step 2202), during a conversion between a current block and a bitstream representation of the current block, a motion vector for a first sub-block inside the current block; using (at step 2204) overlapped block motion compensation (OBMC) mode to perform the conversion; wherein the OBMC mode uses intermediate prediction values of the first sub-block based on the motion vector of the first sub-block and prediction values of at least a second video unit that is neighboring the first sub-block to generate final prediction values for the first sub-block; wherein a sub-block size of the first sub-block is based on block size, block shape, motion information, or reference picture of the current block.

In some implementations, additional modifications can be performed to method 2200. For example, the conversion generates the current block from the bitstream representation. The conversion generates the bitstream representation from the current block. The current block has a width w and a height h, and the size of the first sub-block is M1×M2 if w×h is greater than or equal to a first threshold T1; and the sub-block size is N1×N2 if w×h is smaller than the first threshold T1, where M1, M2, w, h, N1, N2 and T1 are integers. The current block has a width w and a height h, and a ratio of width to height of the first sub-block of the current block w/h is M1 if w is greater than or equal to a second threshold T2, and the ratio of width to height of the first sub-block w/h is N1 if w is smaller than the second threshold T2, where M1, N1 and T2 are integers. The size of the first sub-block M1×M2 is used if the current block is an uni-predicted block, and otherwise, the size of the first sub-block N1×N2 is used. M1×M2 is 4×4. M1×M2 is (w/4)×4 for an above region, and 4×(h/4) for a left region. M1×M2 is (w/4)×2 for an above region, and 4×(h/2) for a left region. N1×N2 is 8×8, or 8×4, or 4×8. N1×N2 is (w/2)×4 for an above region, and 4×(h/2) for a left region. N1×N2 is (w/2)×2 for an above region, and 2×(h/2) for a left region. The method is disabled in affine mode. The method is applied to a translational motion mode. The method is applied to the current block if the current block has a product of width and height w×h greater than or equal to a third threshold T3, wherein T3 is an integer. T3 is 16 or 32. The method is applied to the current block if the current block has a width w greater than or equal to a fourth threshold T4 and a height h greater than or equal to the fourth threshold T4, where T4 is an integer. T is 8. The method is applied to the current block if the current block has a width w greater than or equal to a fifth threshold T5 and a height h greater than or equal to a sixth threshold T6, where T5 and T6 are integers. T5 and T6 are integer multiples of 8, and T5 is same or different from T6. The method is not applied to the current block if the current block has a width w greater than or equal to a seventh threshold T7 or a height h greater than or equal to an eighth threshold T8, where T7 and T8 are integers. T7 and T8 are 128. The current block is coded with intra block copy (IBC) mode, wherein the IBC mode uses a picture of the current block as a reference picture. The second video unit is coded using the IBC mode. The method is applied on all color components. The method is applied on one or more color components. The method is applied only on luma components. Whether and how to apply the method is signaled from an encoder to a decoder in a video parameter set (VPS), a sequence parameter set (SPS), a picture parameter set (PPS), a picture header, a tile group, a slice header, a coding tree unit (CTU), a coding unit (CU), a group of CTUs, or a group of CUs.

Some features preferably implemented by some embodiments are now disclosed in clause-based format.

1. A method for video processing, comprising:
    determining, during a conversion between a current block of visual media data and a corresponding coded representation of the visual media data, at least one neighboring block for the current block;
    determining motion information of the at least one neighboring block; and
    performing Overlapped Block Motion Compensation (OBMC) for the current block based on the motion information of the at least one neighboring block,
    wherein the OBMC tool includes using an intermediate prediction values of one sub-block of the current block and a prediction values of at least one neighboring sub-block to generating a final prediction values of the sub-block.

2. The method of clause 1, wherein performing OBMC for the current block based on the motion information of the at least one neighboring block comprises:
    performing OBMC for all sub-blocks of the current block based on the motion information of the at least one neighboring block.

3. The method of clause 1 or clause 2, wherein the at least one neighboring block comprises a first neighboring block being positioned above the current block and a second neighboring block being positioned left to the current block.

4. The method of anyone of clauses 1-3, wherein the at least one neighboring block and the current block are from the different pictures of the visual media data.

5. The method of anyone of clauses 1-4, wherein the method is applied only when the current block is not coded with a sub-block technology.

6. A method for video processing, comprising:
    determining, during a conversion between a current block of visual media data and a corresponding coded representation of the visual media data, at least one neighboring block for the current block;
    determining motion information of the at least one neighboring block; and
    modifying motion information of the current block based on the motion information of the at least one neighboring block to generate modified motion information for the current block;
    performing processing of the current block based on the modified motion information.

7. The method of clause 6, wherein modifying motion information of the current block based on the motion information of the at least one neighboring block to generate modified motion information for the current block comprises:
    modifying motion information of the current block based on the motion information of the at least one neighboring block and the motion information of the current block to generate modified motion information for the current block.

8. The method of clause 6 or clause 7, wherein modifying motion information of the current block comprises:
    scaling the motion information of the at least one neighboring block to a same reference picture of the current block, and modifying motion information of the current block based on the scaled motion information of the at least one neighboring block and the motion information of the current block.

9. The method of clause 8, wherein the scaled motion information of the at least one neighboring block is weighted averaged or averaged to generate one representative scaled motion vector for each reference picture list of the current block.

10. The method of clause 9, wherein the modified motion information of the current block is generated as the weighted average of the representative scaled motion vector and the motion vector of the current block.

11. The method of clause 10, wherein the modified motion vectors is calculated as: avgMv=(w1*neigScaleMvLX+w2*currMvLX+offset)>>N,
    wherein w1, w2, offset and N are integer numbers, wherein avgMv is the modified motion vectors, neigScaleMvLX is a representative scaled motion vector, and currMvLX is a motion vector of the current block, X is the reference picture list, wherein X=0, 1.

12. The method of clause 11, wherein w1 is 1, w2 is 3, N is 2, and offset is 2 or wherein w1 is 1, w2 is 7, N is 3, and offset is 4.

13. The method of anyone of clauses 6-12, wherein performing processing of the current block based on the motion information of the at least one neighboring block comprises:
    performing processing on boundary region of the current block,
    wherein the boundary region of the current block includes multiple top rows and/or left columns of the current block.

14. The method of clause 13, wherein the representative motion vectors are generated using different neighboring blocks for the top rows of the current block and the left columns of the current block respectively.

15. The method of anyone of clauses 6-14, wherein the method is applied at a sub-block level only when the current block is coded with a sub-block technology.

16. The method of anyone of clauses 6-15, wherein when the at least one neighboring block of a boundary region is intra coded, the method is not performed for the boundary region of the current block.

17. The method of anyone of clauses 6-16, wherein when the at least one neighboring block is intra coded, the method further comprises:
checking adjacent and/or non-adjacent blocks until one inter-coded block is found, and
disable the motion vector modifying processing in response to no inter coded block found.

18. The method of clause 17, wherein non-adjacent blocks include above and/or above-left, and/or above-right neighboring blocks for top boundary region of the current block, and non-adjacent blocks include left and/or above-left and/or below-left neighboring blocks for left boundary region of the current block.

19. The method of clause 17, wherein non-adjacent blocks include above and/or above-left, and/or above-right, and/or left and/or above-left neighboring blocks.

20. The method of clause 17, wherein the non-adjacent blocks are checked in a descending order of distance between the non-adjacent blocks and a corresponding block within the boundary region.

21. The method of anyone of clauses 17-20, wherein a sub-set of the non-adjacent blocks or a number of the non-adjacent blocks are checked, the number is no more than a threshold K.

22. The method of anyone of clauses 17-21, wherein a width of an above-right and above-left area is W/2, and a height of a below-left area is H/2, wherein W and H are the width and height of the current block as a coding unit.

23. The method of anyone of clauses 17-22, wherein when the at least one of neighboring block/non-adjacent block and the current block are bi-predicted or uni-predicted from a reference list, the method is performed in each valid prediction direction.

24. The method of anyone of clauses 17-22, wherein when the at least one of neighboring block/non-adjacent block is uni-predicted from a first list and the current block is bi-predicted, or when the at least one of neighboring block/non-adjacent block is bi-predicted and the current block is uni-predicted from a first list, the modified motion information is generated for the first list.

25. The method of clause 24, wherein the modified motion information is not generated.

26. The method of anyone of clauses 17-22, wherein when the at least one of neighboring block/non-adjacent block and the current block are uni-predicted and are predicted from different directions, the modified motion information is not generated.

27. The method of anyone of clauses 17-22, wherein when the at least one of neighboring block/non-adjacent block and the current block are uni-predicted and are predicted from different directions, a motion vector of the neighboring/non-adjacent block is scaled to a reference picture of the current block and the modified motion information is generated.

28. A method for video processing, comprising:
determining, during a conversion between a current block of visual media data and a corresponding coded representation of the visual media data, multiple neighboring blocks for the current block;
determining motion information of the multiple neighboring blocks;
determining a first prediction block for the current block based on the motion information of the current block;
determining a second predication block for the current block based on the motion information of the multiple neighboring blocks;
modifying the first prediction block based on the second prediction block; and
performing processing of the current block based on the first prediction block.

29. The method of clause 28, wherein the motion information of one of the multiple neighboring block is scaled to a reference picture of the current block to generate a representative scaled motion information which is used to determine a second prediction block of the current block.

30. The method of clause 29, wherein modifying the first prediction block further comprises:
generating the modified prediction block as a weighted average of the first prediction block and the second prediction block.

31. The method of clause 30, wherein performing processing of the current block based on the first prediction block comprises:
performing processing on boundary region of the current block,
wherein the boundary region of the current block includes an above boundary region with multiple top rows and/or a left boundary region with left columns of the current block.

32. The method of clause 31, wherein two different representative scaled motion vectors are generated based on different neighboring blocks for the above boundary region and the left boundary region.

33. The method of clause 32, wherein anyone of the two different scaled motion vectors is used for a top-left boundary region.

34. The method of anyone of clauses 28-33, wherein a motion vector scaling process is skipped.

35. The method of anyone of clauses 28-33, wherein modifying the first prediction block based on the second prediction block comprises:
performing processing on one of more sub-blocks of the current block based on the motion information of the at least one neighboring block.

36. The method of anyone of clauses 28-35, wherein the method is applied only when the current block is coded with a sub-block technology.

37. The method of anyone of clauses 1-36, wherein the sub-block technology comprises Advanced Temporal Motion Vector Prediction (ATMVP), Spatial Temporal Motion Vector Prediction (STMVP), affine mode including affine inter mode and affine merge mode.

38. A video processing method, comprising:
determining, during a conversion between a current block and a bitstream representation of the current block, a motion vector for a first sub-block inside the current block;
using overlapped block motion compensation (OBMC) mode to perform the conversion;
wherein the OBMC mode uses intermediate prediction values of the first sub-block based on the motion vector of the first sub-block and prediction values of at least a second video unit that is neighboring the first sub-block to generate final prediction values for the first sub-block;
wherein a sub-block size of the first sub-block is based on block size, block shape, motion information, or reference picture of the current block.

39. The method of clause 38 wherein the conversion generates the current block from the bitstream representation.

40. The method of clause 38, wherein the conversion generates the bitstream representation from the current block.

41. The method of any of clauses 38-40, wherein the current block has a width w and a height h, and the size of the first sub-block is M1×M2 if w×h is greater than or equal to a first threshold T1; and the sub-block size is N1×N2 if w×h is smaller than the first threshold T1, where M1, M2, w, h, N1, N2 and T1 are integers.

42. The method of any of clauses 38-40, wherein the current block has a width w and a height h, and a ratio of width to height of the first sub-block of the current block w/h is M1 if w is greater than or equal to a second threshold T2, and the ratio of width to height of the first sub-block w/h is N1 if w is smaller than the second threshold T2, where M1, N1 and T2 are integers.

43. The method of clause 41, wherein the size of the first sub-block M1×M2 is used if the current block is an uni-predicted block, and otherwise, the size of the first sub-block N1×N2 is used.

44. The method of clause 41 or 43, wherein M1×M2 is 4×4.

45. The method of clause 41 or 43, wherein M1×M2 is (w/4)×4 for an above region, and 4×(h/4) for a left region.

46. The method of clause 41 or 43, wherein M1×M2 is (w/4)×2 for an above region, and 4×(h/2) for a left region.

47. The method of clause 41 or 43, wherein N1×N2 is 8×8, or 8×4, or 4×8.

48. The method of clause 41 or 43, wherein N1×N2 is (w/2)×4 for an above region, and 4×(h/2) for a left region.

49. The method of clause 41 or 43, wherein N1×N2 is (w/2)×2 for an above region, and 2×(h/2) for a left region.

50. The method of any of clauses 38-49, wherein the method is disabled in affine mode.

51. The method of any of clauses 38-50, wherein the method is applied to a translational motion mode.

52. The method of any of clauses 38-51, wherein the method is applied to the current block if the current block has a product of width and height w×h greater than or equal to a third threshold T3, wherein T3 is an integer.

53. The method of clause 52, wherein T3 is 16 or 32.

54. The method of any of clauses 38-51, wherein the method is applied to the current block if the current block has a width w greater than or equal to a fourth threshold T4 and a height h greater than or equal to the fourth threshold T4, where T4 is an integer.

55. The method of clause 54, wherein T is 8.

56. The method of any of clauses 38-51, wherein the method is applied to the current block if the current block has a width w greater than or equal to a fifth threshold T5 and a height h greater than or equal to a sixth threshold T6, where T5 and T6 are integers.

57. The method of clause 56, wherein T5 and T6 are integer multiples of 8, and T5 is same or different from T6.

58. The method of any of clauses 38-51, wherein the method is not applied to the current block if the current block has a width w greater than or equal to a seventh threshold T7 or a height h greater than or equal to an eighth threshold T8, where T7 and T8 are integers.

59. The method of clause 58, wherein T7 and T8 are 128.

60. The method of clause 38, wherein the current block is coded with intra block copy (IBC) mode, wherein the IBC mode uses a picture of the current block as a reference picture.

61. The method of clause 60, wherein the second video unit is coded using the IBC mode.

62. The method of any of clauses 38-61, wherein the method is applied on all color components.

63. The method of any of clauses 1-61, wherein the method is applied on one or more color components.

64. The method of clause 63, wherein the method is applied only on luma components.

65. The method of any of clauses 1-64, wherein whether and how to apply the method is signaled from an encoder to a decoder in a video parameter set (VPS), a sequence parameter set (SPS), a picture parameter set (PPS), a picture header, a tile group, a slice header, a coding tree unit (CTU), a coding unit (CU), a group of CTUs, or a group of CUs.

66. A video decoding apparatus comprising a processor configured to implement a method recited in one or more of clause 1 to 65.

67. A video encoding apparatus comprising a processor configured to implement a method recited in one or more of clauses 1 to 65.

68 A computer program product having computer code stored thereon, the code, when executed by a processor, causes the processor to implement a method recited in any of clauses 1 to 65.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

It is intended that the specification, together with the drawings, be considered example only, where example means an example. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for processing video data, comprising:
    determining, during a conversion between a current block of a video and a bitstream of the video, at least one neighboring block for the current block;
    determining motion information of the at least one neighboring block;
    determining a first prediction block for the current block based on motion information of the current block;
    determining a second predication block for the current block based on the motion information of the at least one neighboring block;
    generating a final prediction block for the current block based on the first and second prediction blocks; and
    performing the conversion based on the final prediction block,
    wherein the motion information of the at least one neighboring block is scaled to a reference picture of the current block to generate a representative scaled motion information which is used to determine the second prediction block of the current block,
    wherein the scaled motion information of the at least one neighboring block is weighted averaged or averaged to generate one representative scaled motion vector for each reference picture list of the current block,
    wherein motion vector of the current block is modified as the weighted average of the representative scaled motion vector and the motion vector of the current block, and
    wherein the modified motion vector is modified as: avgMv=(w1*neigScaleMvLX+w2*currMvLX+offset)>>N, wherein w1, w2, offset and N are integer numbers, wherein avgMv represents the modified motion vector, neigScaleMvLX represents the representative scaled motion vector, and currMvLX represents a motion vector of the current block, X represents a reference picture list, wherein X=0, 1.

2. The method of claim 1, wherein the conversion comprises encoding the video data into the bitstream.

3. The method of claim 1, wherein the conversion comprises decoding the bitstream to generate pixel values of the video data.

4. The method of claim 1, wherein the final prediction block is generated as a weighted average of the first prediction block and the second prediction block.

5. The method of claim 4, wherein performing the conversion based on the final prediction block comprises:
    performing processing on boundary region of the current block,
    wherein the boundary region of the current block includes an above boundary region with multiple top rows and/or a left boundary region with left columns of the current block.

6. The method of claim 5, wherein two different representative scaled motion vectors are generated based on different neighboring blocks for the above boundary region and the left boundary region.

7. The method of claim 6, wherein any one of the two different scaled motion vectors is used for a top-left boundary region.

8. The method of claim 1, further comprising:
    performing the conversion on one of more sub-blocks of the current block based on the motion information of the at least one neighboring block.

9. The method of claim 8, wherein the method is applied in case that the current block is coded with at least one of Advanced Temporal Motion Vector Prediction (ATMVP), Spatial Temporal Motion Vector Prediction (STMVP), affine mode including affine inter mode and affine merge mode.

10. The method of claim 1, further comprising:
performing Overlapped Block Motion Compensation (OBMC) for the current block based on the motion information of the at least one neighboring block,
wherein the OBMC includes using intermediate prediction values of one sub-block of the current block and prediction values of the at least one neighboring sub-block to generating final prediction values of the one sub-block.

11. The method of claim 10, wherein the OBMC is performed on all sub-blocks of the current block based on the motion information of the at least one neighboring block.

12. The method of claim 1, wherein the at least one neighboring block comprises at least one of a first neighboring block being positioned above the current block and a second neighboring block being positioned left to the current block.

13. The method of claim 1, wherein the at least one neighboring block and the current block are from different pictures of the video.

14. The method of claim 1, wherein w1 is 1, w2 is 3, N is 2, and offset is 2 or wherein w1 is 1, w2 is 7, N is 3, and offset is 4.

15. An apparatus for processing video data comprising a processor and a non-transitory memory with instructions thereon, wherein the instructions upon execution by the processor, cause the processor to:
determine, for a conversion between a current block of a video and a bitstream of the video, at least one neighboring block for the current block;
determine motion information of the at least one neighboring block;
determine a first prediction block for the current block based on motion information of the current block;
determine a second predication block for the current block based on the motion information of the at least one neighboring block;
generate a final prediction block for the current block based on the first and second prediction blocks; and
perform the conversion based on the final prediction block,
wherein the motion information of the at least one neighboring block is scaled to a reference picture of the current block to generate a representative scaled motion information which is used to determine the second prediction block of the current block,
wherein the scaled motion information of the at least one neighboring block is weighted averaged or averaged to generate one representative scaled motion vector for each reference picture list of the current block,
wherein motion vector of the current block is modified as the weighted average of the representative scaled motion vector and the motion vector of the current block, and
wherein the modified motion vector is modified as: avgMv=(w1*neigScaleMvLX+w2*currMvLX+offset)>>N, wherein w1, w2, offset and N are integer numbers, wherein avgMv represents the modified motion vector, neigScaleMvLX represents the representative scaled motion vector, and currMvLX represents a motion vector of the current block, X represents a reference picture list, wherein X=0, 1.

16. A non-transitory computer-readable recording medium storing a bitstream of a video which is generated by a method performed by a video processing apparatus, wherein the method comprises:
determining, for a conversion between a current block of a video and a bitstream of the video, at least one neighboring block for the current block;
determining motion information of the at least one neighboring block;
determining a first prediction block for the current block based on the motion information of the current block;
determining a second predication block for the current block based on the motion information of the at least one neighboring block;
generating a final prediction block for the current block based on the first and second prediction blocks; and
generating the bitstream of the video from the current block based on the final prediction block,
wherein the motion information of the at least one neighboring block is scaled to a reference picture of the current block to generate a representative scaled motion information which is used to determine the second prediction block of the current block,
wherein the scaled motion information of the at least one neighboring block is weighted averaged or averaged to generate one representative scaled motion vector for each reference picture list of the current block,
wherein motion vector of the current block is modified as the weighted average of the representative scaled motion vector and the motion vector of the current block, and
wherein the modified motion vector is modified as: avgMv=(w1*neigScaleMvLX+w2*currMvLX+offset)>>N, wherein w1, w2, offset and N are integer numbers, wherein avgMv represents the modified motion vector, neigScaleMvLX represents the representative scaled motion vector, and currMvLX represents a motion vector of the current block, X represents a reference picture list, wherein X=0, 1.

17. The apparatus of claim 15, wherein the final prediction block is generated as a weighted average of the first prediction block and the second prediction block.

18. The apparatus of claim 15, wherein the conversion based on the final prediction block is performed by:
performing processing on boundary region of the current block,
wherein the boundary region of the current block includes an above boundary region with multiple top rows and/or a left boundary region with left columns of the current block.

19. The apparatus of claim 15, wherein two different representative scaled motion vectors are generated based on different neighboring blocks for an above boundary region and a left boundary region.

20. The apparatus of claim 15, wherein w1 is 1, w2 is 3, N is 2, and offset is 2 or wherein w1 is 1, w2 is 7, N is 3, and offset is 4.

* * * * *